US012462739B2

(12) United States Patent
Choi et al.

(10) Patent No.: US 12,462,739 B2
(45) Date of Patent: Nov. 4, 2025

(54) LIGHT EMITTING DISPLAY APPARATUS

(71) Applicant: LG Display Co., Ltd., Seoul (KR)

(72) Inventors: Youngjun Choi, Paju-si (KR); JeongHyeon Choi, Paju-si (KR); SoJung Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/917,881

(22) Filed: Oct. 16, 2024

(65) Prior Publication Data

US 2025/0182681 A1 Jun. 5, 2025

(30) Foreign Application Priority Data

Nov. 30, 2023 (KR) ........................ 10-2023-0171372

(51) Int. Cl.
*G09G 3/32* (2016.01)

(52) U.S. Cl.
CPC ...................................... *G09G 3/32* (2013.01)

(58) Field of Classification Search
CPC ................... G09G 3/32; G09G 3/3266; G09G 2300/0426; G09G 2300/0852; G09G 2300/0819; G09G 2320/0233; G09G 3/3233; G09G 2320/045; G09G 2300/043; G09G 2300/0842; G09G 2230/00; G09G 2310/08; H10D 86/431
See application file for complete search history.

(56) References Cited

U.S. PATENT DOCUMENTS

| | | | | |
|---|---|---|---|---|
| 10,276,101 | B2 | 4/2019 | Chun | |
| 11,069,292 | B1 * | 7/2021 | Heganovic | G09G 3/3233 |
| 2016/0132171 | A1 * | 5/2016 | Hu | G06F 3/0412 345/174 |
| 2018/0190199 | A1 | 7/2018 | Chun | |
| 2021/0201778 | A1 * | 7/2021 | Kawachi | G09G 3/3233 |

FOREIGN PATENT DOCUMENTS

KR 10-2018-0078476 A 7/2018

* cited by examiner

*Primary Examiner* — Muhammad N Edun
(74) *Attorney, Agent, or Firm* — Fenwick & West LLP

(57) ABSTRACT

A light emitting display apparatus in which a capacitance of a capacitor connected to an anode and a cathode of a light emitting device varies depending on a driving period is disclosed. The light emitting display apparatus includes a light emitting device; and a pixel drive circuit connected to a gate line, a data line, and the light emitting device, wherein the pixel drive circuit includes: a driving transistor connected between a first voltage supply line to which a first voltage is supplied and the light emitting device; and a variable capacitor unit connected between an anode and a cathode of the light emitting device, and a capacitance of the variable capacitor unit varies depending on a driving period.

26 Claims, 8 Drawing Sheets

LIGHT EMITTING DISPLAY APPARATUS

CROSS-REFERENCE TO RELATED APPLICATION

This application claims the benefit of the Republic of Korea Patent Application No. 10-2023-0171372 filed on Nov. 30, 2023, which is hereby incorporated by reference in its entirety.

BACKGROUND

Field of Technology

The present disclosure relates to a light emitting display apparatus.

Discussion of the Related Art

Light emitting display apparatuses are mounted on or provided in electronic products such as televisions, monitors, notebook computers, smart phones, tablet computers, electronic pads, wearable devices, watch phones, portable information devices, navigation devices, or vehicle control display devices, etc., to display images. Pixels are provided in a light emitting display panel configuring a light emitting display apparatus, and an opening portion through which light is output is provided in each of the pixels.

A light emitting device provided in a pixel can be driven by various methods in various driving periods to output light.

In this case, if a capacitor provided between an anode and a cathode of a light emitting device has one capacitance, a lot of time may be required to drive a light emitting device.

SUMMARY

Accordingly, the present disclosure is directed to providing a light emitting display apparatus that substantially obviates one or more problems due to limitations and disadvantages of the related art.

An embodiment of the present disclosure is directed to providing a light emitting display apparatus in which a capacitance of a capacitor provided between an anode and a cathode of a light emitting device varies depending on a driving period.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description as well as the appended drawings.

To achieve these and other advantages and in accordance with the purpose of the disclosure, as embodied and broadly described herein, there is provided a light emitting display apparatus comprising: a light emitting device including an anode and a cathode; and a pixel drive circuit connected to a gate line, a data line, and the light emitting device, wherein the pixel drive circuit includes: a driving transistor connected to a first voltage supply line that supplies a first voltage and the light emitting device; and a variable capacitor circuit connected to the anode and the cathode of the light emitting device, wherein the variable capacitor circuit has a first capacitance during a first driving period and a second capacitance that is different from the first capacitance during a second driving period.

In one embodiment, a light emitting display apparatus comprises: a light emitting device including an anode and a cathode; and a pixel drive circuit connected to a gate line, a data line, and the light emitting device, wherein the pixel drive circuit includes: a driving transistor connected to a first voltage supply line that supplies a first voltage and the light emitting device; and a variable capacitor circuit connected to the anode and the cathode of the light emitting device, wherein a capacitance of the variable capacitor circuit in a driving period during which a data voltage is supplied to the driving transistor is greater than a capacitance of the variable capacitor circuit in other driving periods of the pixel drive circuit.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
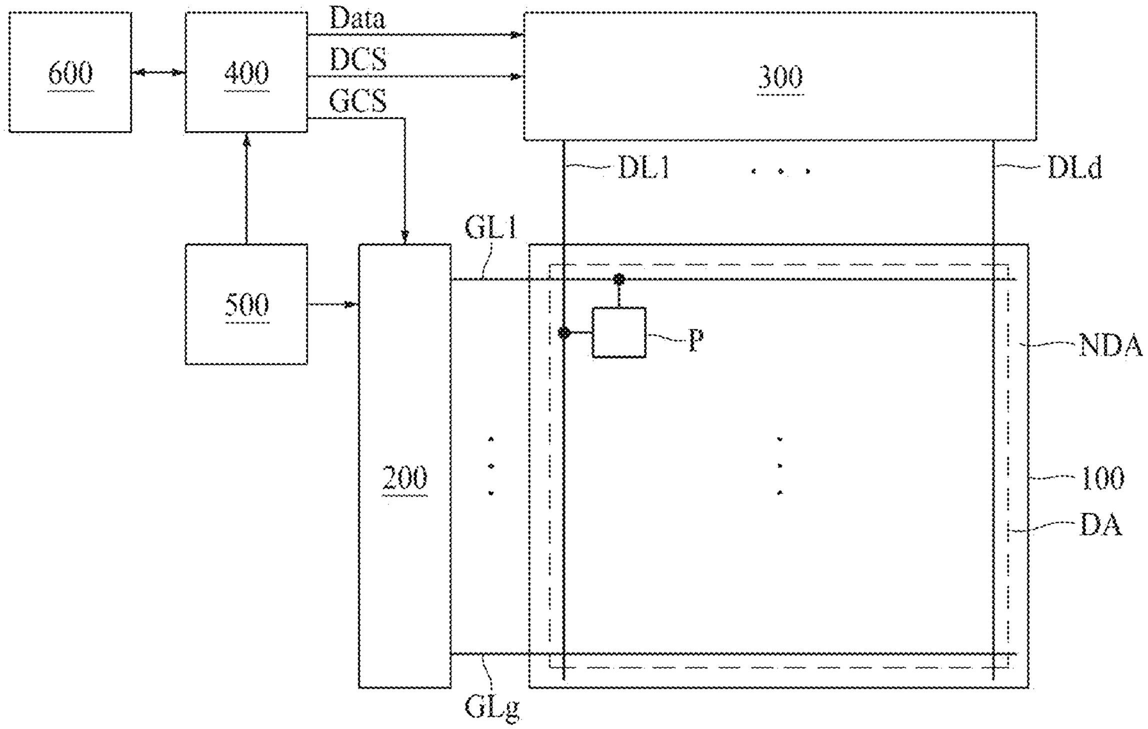
FIG. 1 is an exemplary diagram illustrating a configuration of a light emitting display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present disclosure are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. Also, the term "can" used herein includes all meanings and definitions of the word "may."

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings.

Figure 2:
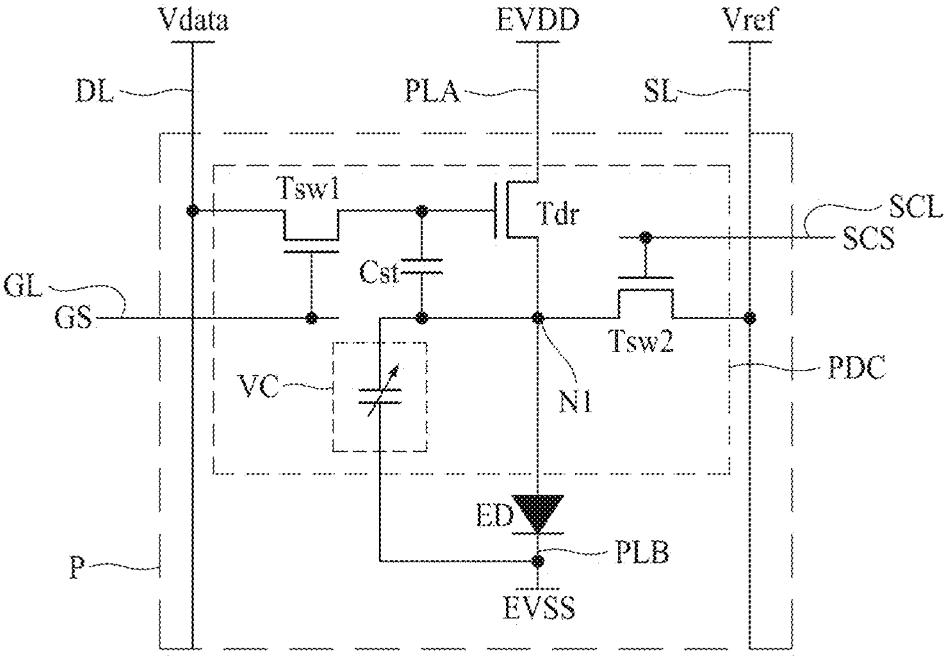
FIG. 2 is an exemplary diagram illustrating a structure of a pixel applied to a light emitting display apparatus according to an embodiment of the present disclosure.
Figure 3:
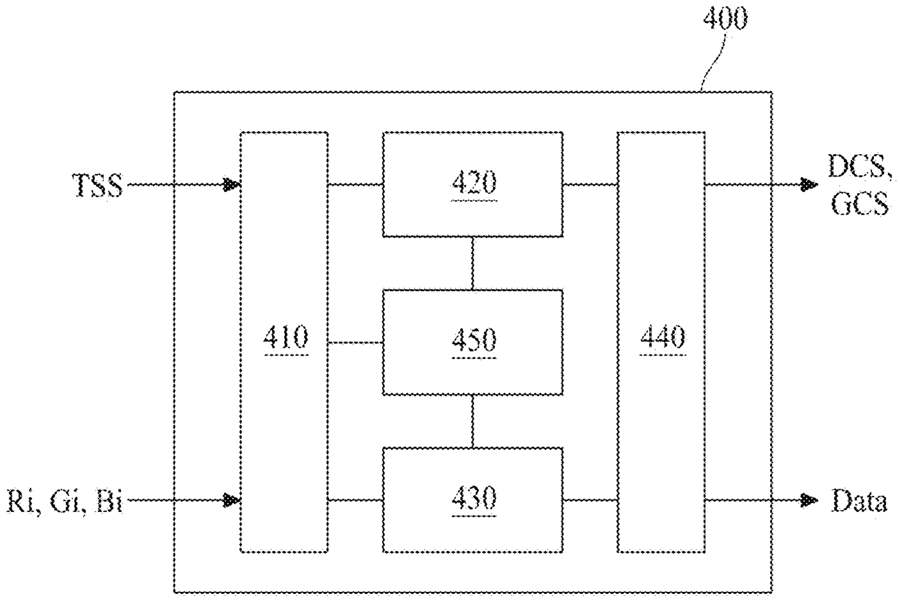
FIG. 3 is an exemplary diagram illustrating a structure of a control driver applied to a light emitting display apparatus according to an embodiment of the present disclosure.
Figure 4:
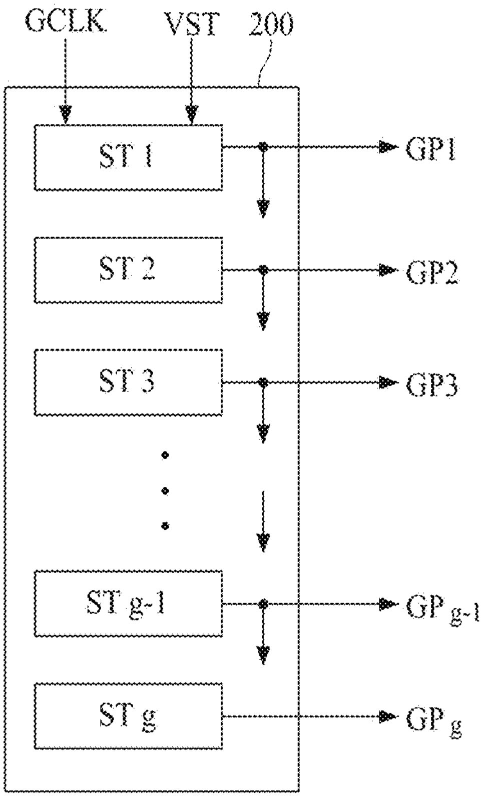
FIG. 4 is an exemplary diagram illustrating a structure of a gate driver applied to a light emitting display apparatus according to an embodiment of the present disclosure.
Figure 5:
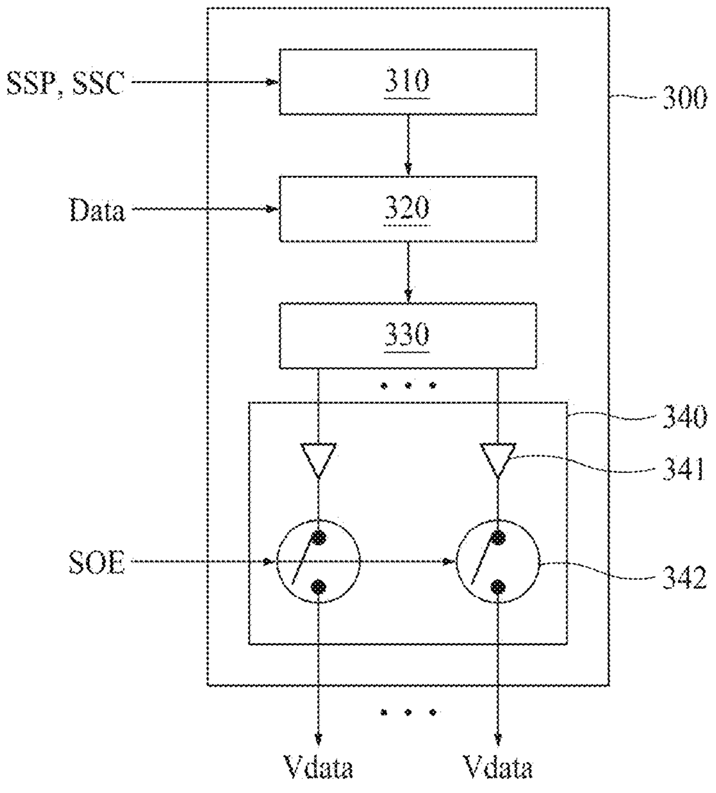
FIG. 5 is an exemplary diagram illustrating a structure of a data driver applied to a light emitting display apparatus according to an embodiment of the present disclosure.

FIG. 1 is an exemplary diagram illustrating a configuration of a light emitting display apparatus according to an embodiment of the present disclosure, FIG. 2 is an exemplary diagram illustrating a structure of a pixel applied to a light emitting display apparatus according to an embodiment of the present disclosure, FIG. 3 is an exemplary diagram illustrating a structure of a control driver applied to a light emitting display apparatus according to an embodiment of the present disclosure, FIG. 4 is an exemplary diagram illustrating a structure of a gate driver applied to a light emitting display apparatus according to an embodiment of the present disclosure, and FIG. 5 is an exemplary diagram illustrating a structure of a data driver applied to a light emitting display apparatus according to an embodiment of the present disclosure.

A light emitting display apparatus according to an embodiment of the present disclosure can be used as various kinds of electronic devices. Electronic devices can be, for example, televisions, monitors, etc.

The light emitting display apparatus according to an embodiment of the present disclosure, as illustrated in FIG. 1, can include a light emitting display panel 100 which includes a display area DA displaying an image and a non-display area NDA provided outside the display area DA, a gate driver 200 which supplies gate signals GS to a plurality of gate lines GL1 to GLg provided in the display area DA of the display panel 100, a data driver 300 which supplies data voltages Vdata to a plurality of data lines DL1 to DLd provided in the display area DA of the display panel 100, a control driver 400 which controls driving of the gate driver 200 and the data driver 300, and a power supply unit 500 which supplies power to the control driver 400, the gate driver 200, the data driver 300, and the light emitting display panel 100.

First, the light emitting display panel 100 can include a display area DA and a non-display area NDA. Gate lines GL1 to GLg, data lines DL1 to DLd, and pixels P can be provided in the display area DA. Accordingly, an image can be displayed in the display area DA. Here, g and d are natural numbers. The non-display area NDA can surround the outer periphery of the display area DA.

The pixel P included in the light emitting display panel 100, as illustrated in FIG. 2, can include a pixel driving circuit PDC which includes a switching transistor Tsw1, a storage capacitor Cst, a variable capacitor unit VC, a driving transistor Tdr, and a sensing transistor Tsw2, and a light emitting device ED connected to the pixel driving circuit PDC.

A first terminal of the driving transistor Tdr can be connected to a first voltage supply line through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP for turning on the switching transistor Tsw1 and a gate-off signal for turning off the switching transistor Tsw1.

The sensing transistor Tsw2 can be provided for measuring a threshold voltage of the driving transistor Tdr or mobility of an electric charge (for example, an electron), or supplying an initialization voltage Vref to the pixel driving circuit PDC. A first terminal of the sensing transistor Tsw2 can be connected to the second terminal of the driving transistor Tdr and the light emitting device ED, a second terminal of the sensing transistor Tsw2 can be connected to a sensing line SL through which the initialization voltage Vref is supplied, and a gate of the sensing transistor Tsw2 can be connected to a sensing control line SCL through which a sensing control signal SCS is supplied.

The sensing line SL can be connected to the data driver 300 and can be connected to the power supply unit 500 through the data driver 300. For example, the initialization voltage Vref supplied from the power supply unit 500 can be supplied to the pixels through the sensing line SL, sensing signals transmitted from the pixels P can be converted into digital sensing signals in the data driver 300, and the digital sensing signals can be transmitted to the control driver 400.

The variable capacitor unit VC (e.g., a variable capacitor circuit) is connected to an anode and a cathode of the light emitting device ED. A capacitance of the variable capacitor unit VC can have different values at various driving periods for driving the light emitting device ED. That is, the variable capacitor unit VC may have a first capacitance at a first driving period and a second capacitance at a second driving period where the second capacitance is different from the first capacitance.

For example, the capacitance of the variable capacitor unit VC can vary depending on a driving period.

The variable capacitor unit VC may include at least one transistor according to one embodiment.

A structure and function of the variable capacitor unit VC will be described with reference to FIGS. 6 to 13.

The light emitting device ED can include a first electrode supplied with a first voltage EVDD through the driving transistor Tdr, a second electrode connected to a second voltage supply line PLB through which a second voltage is supplied, and a light emitting layer provided between the first electrode and the second electrode. The first electrode can be an anode and the second electrode can be a cathode.

The structure of the pixel P applied to a light emitting display apparatus according to an embodiment of the present disclosure is not limited to the structure illustrated in FIG. 2. Accordingly, the structure of the pixel P can be changed to various shapes.

The control driver 400 can realign input image data Ri, Gi, and Bi transmitted from an external system 600 by using a timing synchronization signal TSS transmitted from the external system and can generate a data control signal DCS which is to be supplied to the data driver 300 and a gate control signal GCS which is to be supplied to the gate driver 200.

To this end, as illustrated in FIG. 3, the control driver 400 can include a data aligner 430 (e.g., a circuit) which realigns input image data Ri, Gi, and Bi to generate image data Data, a control signal generator 420 (e.g., a circuit) which generates the gate control signal GCS and the data control signal DCS by using the timing synchronization signal TSS, an input unit 410 (e.g., a circuit) which transmits the timing synchronization signal TSS transmitted from the external system 600 to the control signal generator 420 and transmits the input image data Ri, Gi, and Bi transmitted from the external system 600 to the data aligner 430, and an output unit 440 (e.g., a circuit) which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 can generate a power control signal supplied to the power supply unit 500. The control driver 400 can further include a storage unit for storing various information. The storage unit 450 can be included in the control driver 400 as illustrated in FIG. 3, but can be separated from the control driver 400 and provided independently.

The external system 600 can perform a function of driving the control driver 400 and an electronic device.

For example, when the electronic device is a television (TV), the external system 600 can receive various kinds of sound information, image information, and letter information over a communication network and can transmit the received image information to the control driver 400. For example, the external system 600 can convert the image information into input image data Ri, Gi, and Bi and transmit the input image data Ri, Gi, and Bi to the control driver 400.

The power supply unit 500 can generate various powers and supply the generated powers to the control driver 400, the gate driver 200, the data driver 300, and the light emitting display panel 100.

The gate driver 200 can be directly embedded into the non-display area NDA by using a gate-in panel (GIP) type, or the gate driver 200 can be provided in the display area DA in which light emitting devices ED are provided, or the gate driver 200 can be provided on a chip on film mounted in the non-display area NDA.

The gate driver 200 can supply gate pulses GP1 to GPg to the gate lines GL1 to GLg.

When a gate pulse GP generated by the gate driver 200 is supplied to a gate of the switching transistor Tsw1 included in the pixel P, the switching transistor Tsw1 can be turned on. When the switching transistor Tsw1 is turned on, data voltage Vdata supplied through a data line DL can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage can not be supplied to the pixel P any longer.

The gate signal GS supplied to the gate line GL can include the gate pulse GP and the gate-off signal.

To supply gate pulses GP1 to GPg to gate lines GL1 to GLg, the gate driver 200, as illustrated in FIG. 4, can include stages ST1 to STg connected to gate lines GL1 to GLg.

Each of the stages ST1 to STg can be connected to one gate line GL, but can be connected to at least two gate lines GL.

In order to generate gate pulses GP1 to GPg, a gate start signal VST and at least one gate clock GCLK which are generated by the control signal generator 420 can be transferred to the gate driver 200. For example, the gate start signal VST and the at least one gate clock GCLK can be included in the gate control signal GCS.

One of the stages ST1 to STg can be driven by a gate start signal VST to output a gate pulse GP to a gate line GL. The gate pulse GP can be generated by a gate clock GCLK.

At least one of signals output from a stage ST where a gate pulse is output can be supplied to another stage ST to drive another stage ST. Accordingly, a gate pulse can be output in another stage ST.

For example, the stages ST can be driven sequentially to sequentially supply the gate pulses GP to the gate lines GL.

The data driver 300 can supply data voltages Vdata to the data lines DL1 to DLd.

To this end, the data driver 300, as illustrated in FIG. 5, can include a shift register 310 which outputs a sampling signal, a latch 320 which latches image data Data received from the control driver 400, a digital-to-analog converter 330 which converts the image data Data, transmitted from the latch 320, into a data voltage Vdata and outputs the data voltage Vdata, and an output buffer 340 which outputs the data voltage, transmitted from the digital-to-analog converter 330, to the data line DL on the basis of a source output enable signal SOE.

The shift register 310 can output the sampling signal by using the data control signal DCS received from the control signal generator 420. For example, the data control signals DCS transmitted to the shift register 310 can include a source start pulse SSP and a source shift clock signal SSC.

The latch 320 can latch image data Data sequentially received from the control driver 400, and then output the image data Data to the digital-to-analog converter 330 at the same time on the basis of the sampling signal.

The digital-to-analog converter 330 can convert the image data Data transmitted from the latch 320 into data voltages Vdata and output the data voltages Vdata.

The output buffer 340 can simultaneously output the data voltages Vdata transmitted from the digital-to-analog converter 330 to data lines DL1 to DLd of the light emitting display panel 100 on the basis of the source output enable signal SOE transmitted from the control signal generator 420.

To this end, the output buffer 340 can include a buffer 341 which stores the data voltage Vdata transmitted from the digital-to-analog converter 330 and a switch 342 which outputs the data voltage Vdata stored in the buffer 341 to the data line DL on the basis of the source output enable signal SOE.

For example, when the switches 342 are turned on based on the source output enable signal SOE simultaneously supplied to the switches 342, the data voltages Vdata stored in the buffers 341 can be supplied to the data lines DL1 to DLd through the switches 342.

The data voltages Vdata supplied to the data lines DL1 to DLd can be supplied to pixels P connected to a gate line GL supplied with a gate pulse GP.

Figure 6:
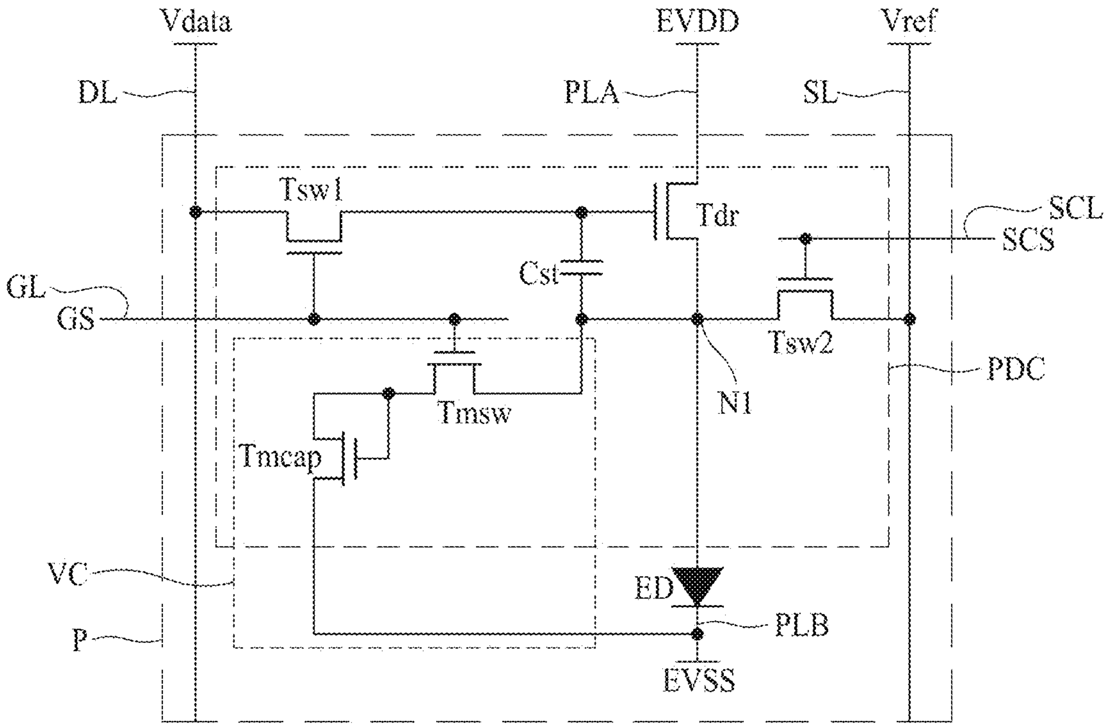
FIG. 6 is another exemplary diagram illustrating a structure of a pixel applied to a light emitting display apparatus according to an embodiment of the present disclosure.
Figure 7:
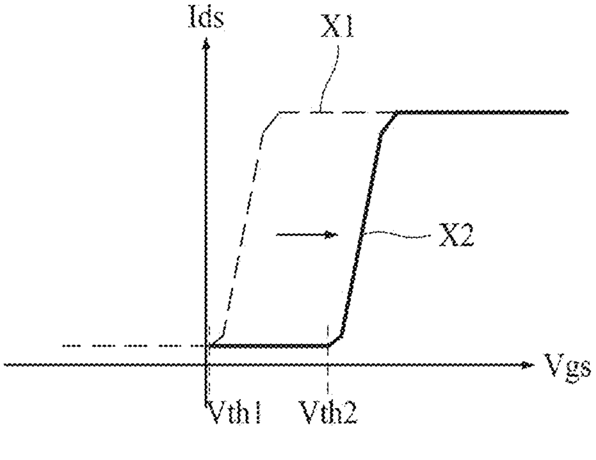
FIG. 7 is an exemplary diagram illustrating threshold voltages of first and second transistors illustrated in FIG. 6 apparatus according to an embodiment of the present disclosure.
Figure 8:
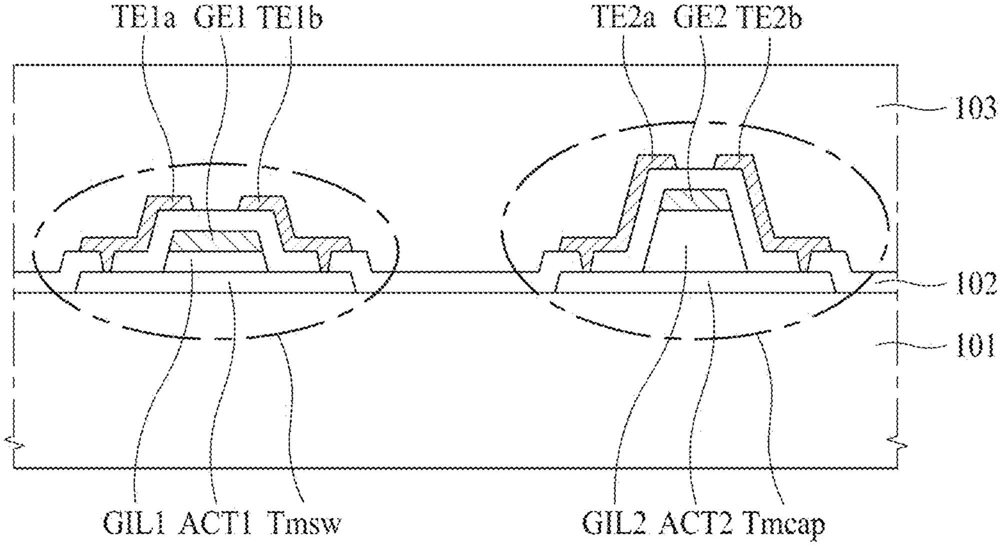
FIG. 8 is an exemplary diagram illustrating a cross-sectional surface of first and second transistors illustrated in FIG. 6 apparatus according to an embodiment of the present disclosure.
Figure 9:
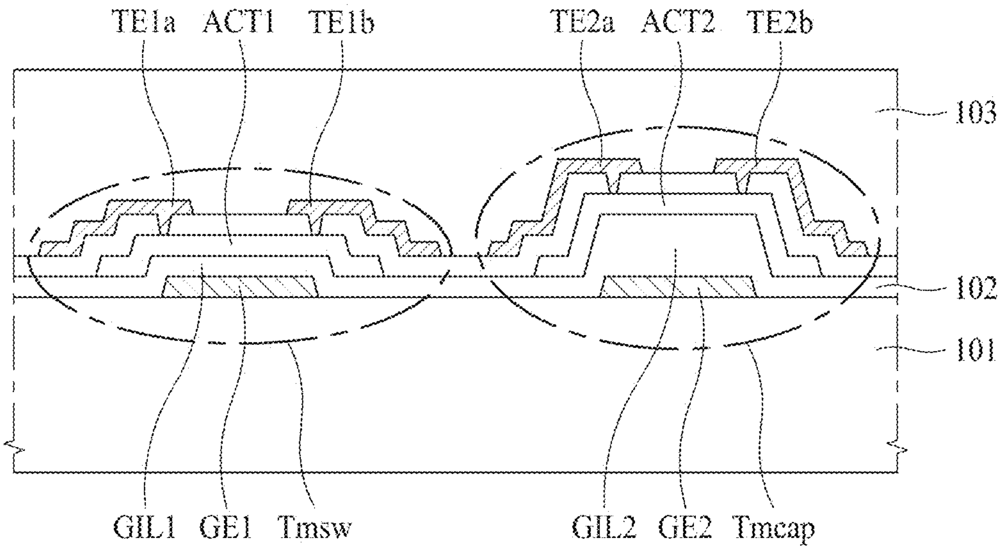
FIG. 9 is another exemplary diagram illustrating a cross-sectional surface of first and second transistors illustrated in FIG. 6 apparatus according to an embodiment of the present disclosure.

FIG. 6 is another exemplary diagram illustrating a structure of a pixel applied to a light emitting display apparatus according to an embodiment of the present disclosure, FIG. 7 is an exemplary diagram illustrating threshold voltages of first and second transistors illustrated in FIG. 6, FIG. 8 is an exemplary diagram illustrating a cross-sectional surface of first and second transistors illustrated in FIG. 6, and FIG. 9 is another exemplary diagram illustrating a cross-sectional surface of first and second transistors illustrated in FIG. 6. In the following descriptions, details which are the same as or similar to details described with reference to FIGS. 1 to 5 are omitted or will be simply described.

A pixel P applied to a light emitting display apparatus according to an embodiment of the present disclosure includes a light emitting device ED and a pixel driving circuit PDC, as described above. The pixel driving circuit PDC is connected to a gate line GL, a data line DL, and the light emitting device ED.

As illustrated in FIGS. 2 and 6, the pixel driving circuit PDC includes the driving transistor Tdr connected between the first voltage supply line PLA supplied with the first voltage EVDD and the light emitting device ED, and the variable capacitor unit VC connected between the anode and the cathode of the light emitting device ED.

In addition, the pixel driving circuit can further include the switching transistor Tsw1, the storage capacitor Cst, and the sensing transistor Tsw2.

Particularly, the variable capacitor unit VC is connected to the anode and the cathode of the light emitting device ED.

A capacitance of the variable capacitor unit VC can be changed depending on a driving period. That is, the capacitance of the variable capacitor unit VC can have different values in various driving periods for driving the light emitting device ED.

In one embodiment, the variable capacitor unit VC can include a first transistor Tmsw and a second transistor Tmcap, as illustrated in FIG. 6.

A first terminal of the first transistor Tmsw is connected to a first terminal and a gate of the second transistor Tmcap.

A second terminal of the first transistor Tmsw is connected to the anode, the storage capacitor Cst, the second terminal of the driving transistor Tdr, and the second terminal of the sensing transistor Tsw2.

As described above with reference to FIG. 2, the second terminal of the driving transistor Tdr is connected to the anode of the light emitting device ED. Accordingly, the second terminal of the first transistor Tmsw is connected to the anode and the second terminal of the driving transistor Tdr.

In the following description, a node to which the anode and the second terminal of the driving transistor are connected is referred to as a first node N1. Accordingly, the second terminal of the first transistor Tmsw is connected to the first node N1.

A gate of the first transistor Tmsw is connected to a gate line GL.

The gate line GL is also connected to the gate of the switching transistor Tsw1 that is connected to the gate of the driving transistor Tdr and the data line DL, as described with reference to FIG. 2.

For example, in a light emitting display apparatus according to the present disclosure, in order to prevent an increase in signal lines, the gate line GL can be commonly connected to the gate of the switching transistor Tsw1 and the gate of the first transistor Tsw.

To provide an additional description, a turn-on and turn-off of the first transistor Tmsw can be controlled by a gate signal GS supplied to the gate line GL that also controls a turn-on and turn-off of the switching transistor Tsw1.

Therefore, according to a light emitting display apparatus according to the present disclosure, because a separate line for controlling the first transistor Tmsw does not need to be provided on the light emitting display panel, a resolution equal to or similar to that of the related art light emitting display panel can be implemented.

The first terminal of the second transistor Tmcap is connected to the first terminal of the first transistor Tmsw, and the gate of the second transistor Tmcap is connected to the first terminal of the first transistor Tmsw and its own first terminal. That is, the first terminal of the first transistor Tmsw is connected to the first terminal and the gate of the second transistor Tmcap.

A second terminal of the second transistor Tmcap is connected to the cathode of the light emitting device ED.

This structure is called a diode connection structure.

Due to the diode connection structure, the second transistor Tmcap can perform a function of a capacitor.

For example, when the second transistor Tmcap is a metal oxide semiconductor field effect transistor (MOSFET), the second transistor Tmcap can function as a capacitor, and thus the second transistor Tmcap can become a MOS capacitor.

In particular, the capacitance when the second transistor Tmcap having the diode connection structure is turned on can be greater than the capacitance when the second transistor Tmcap is turned off.

Therefore, in a light emitting display apparatus according to the present disclosure, the second transistor Tmcap having the diode connection structure can function as a variable capacitor.

In a light emitting display apparatus according to the present disclosure, another reason why the second transistor Tmcap can function as a variable capacitor is that the threshold voltage Vth2 of the second transistor Tmcap is different from the threshold voltage Vth1 of the first transistor Tmsw. In particular, when the first transistor Tmsw and the second transistor Tmcap are N-type transistors, the threshold voltage of the second transistor Tmcap may be greater than the threshold voltage of the first transistor Tmsw and the threshold voltage of the driving transistor Tdr.

For example, a first graph X1 illustrated in FIG. 7 is a graph illustrating drain-source current according to gate-source voltage of an N-type metal oxide semiconductor field effect transistor (MOSFET), and a second graph X2 illustrated in FIG. 7 is another graph illustrating drain-source current according to gate-source voltage of the N-type MOSFET.

In this case, the first graph X1 may be a graph illustrating the drain-source current Ids according to the gate-source voltage Vgs of at least one of the switching transistor Tsw1, the driving transistor Tdr, the sensing transistor Tsw2, and the first transistor Tmsw. Hereinafter, for convenience of description, the first graph X1 is a graph illustrating the drain-source current according to the gate-source voltage of the first transistor Tsw.

Moreover, the second graph X1 is a graph illustrating the drain-source current Ids according to the gate-source voltage Vgs of the second transistor Tmcap.

In this case, the threshold voltage Vth2 of the second transistor Tmcap is more moved in a positive direction than the threshold voltage of the first transistor Tmsw.

This means that in order to turn on the second transistor Tmcap, a voltage greater than the voltage for turning on the first transistor Tmsw is required.

To provide an additional description, in FIG. 6, when the first transistor Tmsw is turned on, a voltage supplied to the first transistor Tmsw can be supplied to the gate of the second transistor Tmcap.

In this case, if the voltage supplied to the gate of the second transistor Tmcap is less than the threshold voltage Vth2 of the second transistor Tmcap, the second transistor Tmcap is not turned on.

However, when the voltage supplied to the gate of the second transistor Tmcap continuously rises to be equal to or greater than the threshold voltage Vth2 of the second transistor Tmcap, the second transistor Tmcap can be turned on.

To provide an additional description, in a light emitting display apparatus according to an embodiment of the present disclosure, when the first transistor Tmsw, the driving transistor Tdr, and the second transistor Tmcap are N-type transistors, if the threshold voltage of the second transistor Tmcap is formed to be greater than the threshold voltage of the first transistor Tmsw and the threshold voltage of the driving transistor Tdr, the second transistor Tmcap can function as a variable capacitor.

There are various methods of forming the threshold voltage of the second transistor Tmcap provided in the light emitting display panel 100 to be greater than the threshold voltage of the first transistor Tmsw and the threshold voltage of the driving transistor Tdr which are provided in the light emitting display panel 100.

For example, as illustrated in FIGS. 8 and 9, when a thickness of a second gate insulation layer GIL2 of the second transistor Tmcap is greater than a thickness of a first gate insulation layer GIL1 of the first transistor Tmsw, the threshold voltage Vth2 of the second transistor Tmcap can move more in a positive direction than the threshold voltage of the first transistor Tmsw.

Accordingly, the second transistor Tmcap can function as a variable capacitor.

To provide an additional description, as illustrated in FIGS. 8 and 9, the first transistor Tmsw can include a first active ACT1 (e.g., a first active layer), a first gate electrode GE1, and the first gate insulation layer GIL1 provided between the first active ACT1 and the first gate electrode GE1, and the second transistor Tmcap can include a second active ACT2 (e.g., a second active layer), a second gate electrode GE2, and the second gate insulation layer GIL2 provided between the second active ACT2 and the second gate electrode GE2.

In this case, the thickness of the second insulation layer GIL2 can be greater than the thickness of the first gate insulation layer GIL1.

For example, as illustrated in FIG. 8, the light emitting display panel 100 can include a substrate 101, the first active ACT1 and the second active ACT2 provided on the substrate 101, the first gate insulation layer GIL1 provided on the first active ACT1, the second gate insulation layer GIL2 provided on the second active ACT2, the first gate electrode GE1 provided on the first gate insulation layer GIL1, the second gate electrode GE2 provided on the second gate insulation layer GIL2, a passivation layer 102 covering the first gate electrode GE1 and the second gate electrode GE2, a 1a-th electrode TE1a (e.g., a first drain electrode) and a 1b-th electrode TE1b (e.g., a first source electrode) provided on the passivation layer 102 to be connected to first and second terminals of the first active ACT1, a 2a-th electrode TE2a (e.g., a second drain electrode) and a 2b-th electrode TE2b (e.g., a second source electrode) provided on the protective layer 102 to be connected to first and second terminals of the second active ACT2, and a planarization layer 103 covering the 1a-th electrode TE1a, the 1b-th electrode TE1b, the 2a-th electrode TE2a, the 2b-th electrode TE2b, and the passivation layer 102.

The substrate 101 can be a glass substrate, a plastic substrate, or a flexible film.

A buffer layer can be further provided on the substrate 101, and the first active ACT1 and the second active ACT2 can be provided on the buffer layer.

Moreover, at least one light blocking plate can be further provided on the substrate 101 to block light flowing into at least one of an active of the driving transistor Tdr, the first active ACT1, and second active ACT2, and the at least one light blocking plate can be covered by the buffer layer. In this case, the active of the driving transistor Tdr, the first active ACT1, and the second active ACT2 can be provided on the buffer layer.

The first transistor Tmsw can include the first active ACT1, the first gate insulation layer GIL1, the first gate electrode GE1, the passivation layer 103, the 1a-th electrode TE1a, and the 1b-th electrode TE1b.

The second transistor Tmcap can include the second active ACT2, the second gate insulation layer GIL2, the second gate electrode GE2, the passivation layer 103, the 2a-th electrode TE2a, and the 2b-th electrode TE2b.

The switching transistor Tsw1, the driving transistor Tdr, and the sensing transistor Tsw2 illustrated in FIG. 6 can be further provided in the same layer as the first and second transistors Tsw and Tsw2. However, the switching transistor Tsw1, the driving transistor Tdr, and the sensing transistor Tsw2 can be provided in a different layer from the first and second transistors Tmsw and Tmcap.

Moreover, the first transistor Tmsw and the second transistor Tmcap need not be formed on the same layer. Therefore, the first transistor Tmsw and the second transistor Tmcap can be provided on different layers.

An anode, a light emitting layer, and a cathode configuring the light emitting device ED can be sequentially provided on the planarization layer 103.

The anode can be provided for each pixel, and the anodes provided in the pixels can be separated from each other.

The light emitting layer can be commonly provided in the pixels. However, the light emitting layer can be provided for each pixel, and the light emitting layers provided in the pixels can be separated from each other.

The cathode can be commonly provided in pixels.

An encapsulation layer for sealing the light emitting devices can be provided on the cathode.

In this case, as described above, the thickness of the second insulation layer GIL2 configuring the second transistor Tmcap can be greater than the thickness of the first gate insulation layer GIL1 configuring the first transistor Tmsw.

The first gate insulation layer GIL1 and the second gate insulation layer GIL2 can be separated from each other, as illustrated in FIG. 8, but can be one layer provided on the entire substrate 101 as shown in FIG. 9.

For example, the first gate insulation layer GIL1 and the second gate insulation layer GIL2 can be formed by exposing and etching a gate insulation material, which is provided on the entire surface of the substrate 101 to cover the first active ACT1 and the second active ACT2, by a half-tone mask.

For example, the thickness of the first gate insulation layer GIL1 and the thickness of the second gate insulation layer GIL can vary by the half-tone mask.

Also, as illustrated in FIG. 9, the thickness of the second insulation layer GIL2 configuring the second transistor Tmcap can be greater than the thickness of the first gate insulation layer GIL1 configuring the first transistor Tmsw, in a light emitting display panel in which the first gate electrode GEL and the second gate electrode GE2 are provided on the substrate 101, the first gate electrode GE1 and the second gate electrode GE2 are covered by the first gate insulation layer GIL1 and the second gate insulation layer GIL2, and the first active ACT1 and the second active ACT2 are provided on the first gate insulation layer GIL1 and the second gate insulation layer GIL2.

That is, regardless of the structure of the first transistor Tmsw and the second transistor Tmcap, if the thickness of the second insulation layer GIL2 configuring the second transistor Tmcap is greater than the thickness of the first gate insulation layer GIL1 configuring the first transistor Tmsw, the threshold voltage of the second transistor Tmcap can be greater than the threshold voltage of the first transistor Tmsw, and thus the second transistor Tmcap can function as a variable capacitor.

In addition to the above-described method, there are various methods for making the threshold voltage of the second transistor Tmcap greater than the threshold voltage of the first transistor Tmsw.

For example, the second transistor Tmcap can be a metal-oxide-silicon (MOS) capacitor, which is a silicon (Si)-based capacitor, and in this case, the gate and drain of the MOSFET can be connected to form the diode connection structure.

Also, the second transistor Tmcap can be a MOSFET package having the diode connection structure.

Moreover, the second transistor Tmcap can be a thin film transistor having the diode connection structure in which a gate and a drain are connected. In this case, low temperature polysilicon and oxide can be mixed.

In the above examples, in order for the threshold voltage of the second transistor Tmcap to shift more in the positive direction than a threshold voltage of each of the driving transistor Tdr, the switching transistor Tsw1, the sensing transistor Tsw2, and the first transistor Tmsw, the thickness of the second gate insulation layer GIL2 configuring the second transistor Tmcap can be formed to be greater than a thickness of a gate insulation layer configuring each of the driving transistor Tdr, the switching transistor Tsw1, the sensing transistor Tsw2, and the first transistor Tmsw.

Moreover, in order for the threshold voltage of the second transistor Tmcap to shift more in the positive direction than a threshold voltage of each of the driving transistor Tdr, the switching transistor Tsw1, the sensing transistor Tsw2, and the first transistor Tmsw, the second active ACT2 configuring the second transistor Tmcap can be formed of a material different from the material of the active configuring the driving transistor Tdr, the switching transistor Tsw1, the sensing transistor Tsw2, and the first transistor Tmsw.

For example, a channel of the second transistor Tmcap can be formed of the material different from the material of the channel of other transistors.

A detailed method in which the second transistor Tmcap performs the function as the variable capacitor will be described with reference to FIG. 10.

Figure 10:
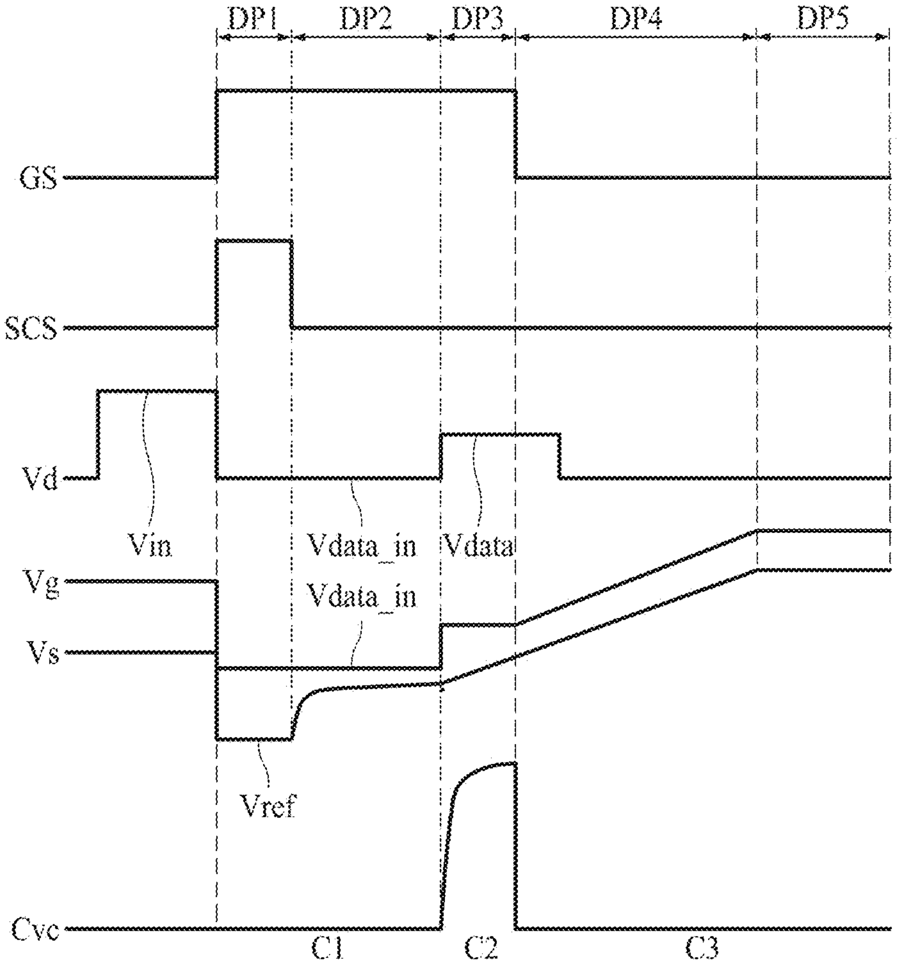
FIG. 10 is an exemplary diagram illustrating signals applied to driving of a pixel illustrated in FIG. 6 apparatus according to an embodiment of the present disclosure.
Figure 11:
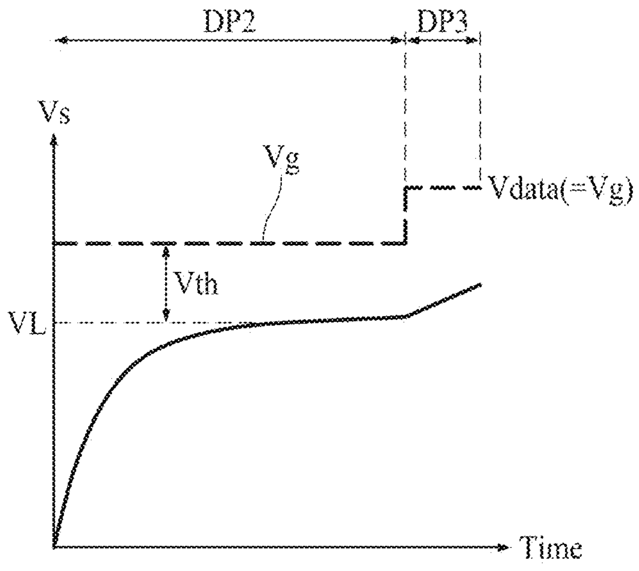
FIG. 11 is an exemplary diagram illustrating changes in source voltage Vs between a second driving period and a third driving period illustrated in FIG. 10 apparatus according to an embodiment of the present disclosure.

FIG. 10 is an exemplary diagram illustrating signals applied to driving of a pixel illustrated in FIG. 6, and FIG. 11 is an exemplary diagram illustrating changes in source voltage Vs between a second driving period and a third driving period illustrated in FIG. 10. In the following descriptions, details which are the same as or similar to details described with reference to FIGS. 1 to 9 are omitted or will be simply described.

First, when a first driving period DP1 starts, a high-level gate signal GS and a high-level sensing control signal SCS are supplied from the gate driver 200 to the pixel P.

For example, as described above, the gate driver 200 can generate the gate signal GS and can generate the sensing control signal SCS in the same or similar manner as or to the method of generating the gate signal GS.

To this end, the gate driver 200 can include a stage for generating the sensing control signal SCS and a stage for generating the gate signal GS. However, the sensing control signal SCS can be generated in the stage for generating the gate signal GS.

Immediately before the first driving period 1DP starts, an initial data voltage can be supplied through the data line DL. Accordingly, the data line DL can be initialized to the initial voltage Vin.

The switching transistor Tsw1 is turned on by the high-level gate signal GS, and the sensing transistor Tsw2 is turned on by the high-level sensing control signal SCS.

In this case, an initial data voltage Vdata_in can be supplied from the data line initialized by the initial voltage Vin just before the first driving period DP1 to the gate of the driving transistor Tdr through the switching transistor Tsw1.

Accordingly, the gate of the driving transistor Tdr can be initialized by the initial data voltage Vdata_in. That is, as illustrated in FIG. 10, a gate voltage (hereinafter, simply referred to as a gate voltage Vg) of the driving transistor Tdr can include the initial data voltage Vdata_in.

The initial data voltage Vdata_in can be set to be lower than the threshold voltage of the light emitting device ED.

In the first driving period DP1, the anode of the light emitting device ED and the second terminal of the driving transistor Tdr can be initialized by the initialization voltage Vref supplied through the turned-on sensing transistor Tsw2.

As described above, the node to which the anode and the second terminal of the driving transistor are connected is referred to as the first node N1.

When the driving transistor Tdr is an N-type transistor, as illustrated in FIG. 6, the second terminal of the driving transistor Tdr can be a source of the driving transistor Tdr. The source of the driving transistor Tdr is connected to the anode.

Therefore, as illustrated in FIG. 10, a source voltage (hereinafter, simply referred to as a source voltage Vs) of the driving transistor Tdr can include the initialization voltage Vref.

For example, during the first driving period DP1, the gate of the driving transistor Tdr can be initialized by the initial data voltage Vdata_in, and the source of the driving transistor Tdr can be initialized to the initialization voltage Vref.

Therefore, the first driving period DP1 can be referred to as an initialization period.

In this case, the first transistor Tmsw is also turned on by the high-level gate signal GS.

Accordingly, the initialization voltage Vref supplied to the first node N1 can be supplied to the first terminal and gate of the second transistor Tmcap through the first transistor Tmsw. Here, when the second transistor Tmcap is an N-type, as illustrated in FIG. 6, the first terminal of the second transistor Tmcap can be a drain.

For example, the second transistor Tmcap has the diode connection structure in which a drain and a gate are connected.

In this case, the second transistor Tmcap can be formed such that the threshold voltage of the second transistor Tmcap is shifted more in the positive direction than the threshold voltage of the first transistor Tmsw and the threshold voltage of the driving transistor Tdr, as described with reference to FIG. 7.

In particular, the second transistor Tmcap can be formed not to be turned on by the initialization voltage Vref. That is, the second transistor Tmcap is not turned on during the first driving period DP1. Accordingly, even if the initialization voltage Vref is supplied to the gate of the second transistor Tmcap during the first driving period DP1, the second transistor Tmcap is not turned on.

Because the second transistor Tmcap is not turned on, the capacitance Cvc of the second transistor Tmcap has a value of 0 or a very small value.

Next, when a second driving period DP2 starts, a high-level gate signal GS and a low-level sensing control signal SCS are supplied from the gate driver 200 to the pixel P.

For example, the high-level gate signal GS is supplied to the pixel through the gate line GL in the first driving period DP1 and the second driving period DP2.

However, the sensing control signal SCS having a high level in the first driving period DP1 has a low level in the second driving period DP2.

The switching transistor Tsw1 is turned on by the high-level gate signal GS, and the sensing transistor Tsw2 is turned off by the low-level sensing control signal SCS.

The gate voltage Vg of the driving transistor Tdr in the second driving period DP2 can be the same as the gate voltage Vg of the driving transistor Tdr in the first driving period DP1. That is, the gate voltage Vg of the driving transistor Tdr in the second driving period DP2 can include the initial data voltage Vdata_in.

In the second driving period DP2, the sensing transistor Tsw2 is turned off, and thus the first node N1 is floated.

The first transistor Tmsw is turned on by the high-level gate signal GS, and the second transistor Tmcap maintains a turned-off state.

Therefore, the capacitance Cvc of the second transistor Tmcap has a value of 0 or a very small value.

As described above, the voltage of the first node N1 is the source voltage Vs of the driving transistor Tdr.

The first node N1 is floated during the second driving period DP2, and the capacitance Cvc of the second transistor Tmcap has a value of 0 or a very small value. That is, the capacitance Cvc between the anode and cathode of the light emitting device ED has a value of 0 or a very small value. Accordingly, after the source voltage Vg of the driving transistor Tdr is rapidly increased, as illustrated in FIG. 10, the source voltage Vg can be saturated to a specific value.

In particular, the source voltage Vs can rise until the difference between the gate voltage Vg and the source voltage Vs becomes the threshold voltage Vth of the driving transistor Tdr, in the second driving period DP2.

That is, the source voltage Vs can increase to a level obtained by subtracting the threshold voltage Vth from the gate voltage Vg of the second driving period DP2.

To provide an additional description, in the second period DP2, the first node N1 is floated, the second transistor Tmcap can function as a capacitor, and the capacitance Cvc of the second transistor Tmcap has a very small value.

Accordingly, when the second driving period DP2 starts and the driving transistor Tdr is turned on, the source voltage Vg of the driving transistor Tdr is rapidly increased by the second transistor Tmcap having a small capacitance Cvc, and at the end of the second period DP2, the source voltage Vs can include a difference value (Vs=Vg−Vth) between the gate voltage Vg of the driving transistor Tdr and the threshold voltage Vth of the driving transistor Tdr.

That is, at the end of the second driving period DP2, the difference value (hereinafter, simply referred to as a gate-source voltage Vgs) between the gate voltage Vg and source voltage Vs of the driving transistor Tdr can be the threshold voltage Vth of the driving transistor. Accordingly, at the end of the second period DP2, the driving transistor Tdr is turned off.

For example, the luminance of light output in a light emitting period (a fifth driving period DP5) can be determined by the magnitude of the current supplied to the light emitting device ED. In particular, the magnitude of the current supplied to the light emitting device ED is proportional to the square of the difference voltage between the gate-source voltage (Vgs=Vg−Vs) and threshold voltage Vth of the driving transistor Tdr, as described in Equation 1.

$$Ids \propto (Vgs - Vth)^2 \quad \text{[Equation 1]}$$

As described above, at the second driving period DP2, the source voltage Vs can include a difference value (Vs=Vg−Vth) between the gate voltage Vg and the threshold voltage Vth.

Therefore, when the difference voltage between the gate-source voltage Vgs and the threshold voltage Vth at the second driving period DP2 is expressed only using the gate voltage Vg, the source voltage Vs, and the threshold voltage Vth, the difference voltage between the gate-source voltage Vgs and the threshold voltage Vth becomes [Vg−(Vg−Vth)]−Vth=0.

Therefore, the difference voltage between the gate-source voltage Vgs and the threshold voltage Vth at the second driving period DP2 is not affected by the threshold voltage Vth.

To provide an additional description, the capacitance Cvc (hereinafter, simply referred to as the first capacitance C1) of the second transistor Tmcap has a very small value in the first driving period DP1 and the second driving period DP2. Accordingly, the source voltage Vs, which is the voltage of the floated first node N1, can quickly rise from the initialization voltage Vref to be a value including the difference value Vs=Vg−Vth between the gate voltage Vg and the threshold voltage Vth.

In this case, the threshold voltage Vth of the driving transistor Tdr is not included in the difference voltage between the gate-source voltage Vgs and the threshold voltage Vth. Therefore, even in the third to fifth driving periods DP3 to DP5 thereafter, the threshold voltage Vth is not included in the calculation equation of the current Ids flowing through the light emitting device ED.

Therefore, the luminance of light output from the light emitting device ED during the light emitting period (the fifth driving period DP5) is not affected by the threshold voltage Vth of the driving transistor Tdr.

Therefore, the second driving period DP2 can be referred to as a threshold voltage compensation period.

For example, according to the present disclosure, because the first capacitance C1 of the second transistor Tmcap is very small during the second driving period DP2, the source voltage Vs is rapidly increased, and in particular, the source voltage Vs can be rapidly increased until the difference voltage between the source voltage Vs and the gate voltage Vg becomes the threshold voltage Vth of the driving transistor Tdr.

In this case, the threshold voltage Vth can be removed from the formula for calculating the current Ids flowing to the light emitting device ED.

Accordingly, even if the threshold voltage Vth of the driving transistor Tdr is changed due to the continuous use of the light emitting display apparatus, the luminance of light output from the light emitting device ED may not be affected by the threshold voltage Vth.

Next, when the third driving period DP3 starts, a high-level gate signal GS and a low-level sensing control signal SCS are supplied from the gate driver 200 to the pixel P, and a data voltage Vdata is supplied from the data driver 300 to the gate of the driving transistor Tdr through the data line DL and the switching transistor Tsw.

That is, the high-level gate signal GS for turning on the switching transistor Tsw1 and the first transistor Tsw is supplied to the pixel P through the gate line GL in the first driving period DP1, the second driving period DP2, and the third driving period DP3. The high-level gate signal GS for turning on the switching transistor Tsw1 and the first transistor Tsw denotes the gate pulse GP.

However, the sensing control signal SCS having a high level in the first driving period DP1 has a low level in the second driving period DP2 and the third driving period DP3.

The switching transistor Tsw1 is turned on by the high-level gate signal GS, and the sensing transistor Tsw2 is turned off by the low-level sensing control signal SCS.

The gate voltage Vg of the driving transistor Tdr in the third driving period DP3 can include the data voltage Vdata. As described above, the initial voltage Vin, the data initialization voltage Vdata_in, and the data voltage Vdata can be supplied through the data line DL. Accordingly, the initial voltage Vin, the data initialization voltage Vdata_in, and the data voltage Vdata can be collectively referred to as the data line voltage Vd.

In the third driving period DP3, the sensing transistor Tsw2 is turned off, and thus the first node N1 is floated.

A storage capacitor Cst is connected between the gate of the driving transistor Tdr and the source of the driving transistor Tdr.

Therefore, as the gate voltage Vg rises to the data voltage Vdata during the third driving period DP3, the source voltage Vs can also rise.

In this case, if the source voltage Vs increases, the voltage supplied to the gate of the second transistor Tmcap can increase, and accordingly, the second transistor Tmcap can be turned on.

That is, when the source voltage Vs is supplied to the gate of the second transistor Tmcap through the first transistor Tmsw turned on by the high-level gate signal GS, the second transistor Tmcap can be turned on.

To this end, the threshold voltage of the second transistor Tmcap can be set so that the second transistor Tmcap can be turned on by the source voltage Vs at the timing at which the third driving period DP3 starts.

To provide an additional description, the second transistor Tmcap can be turned off during the first driving period DP1 and the second driving period DP2 during which the sensing transistor Tsw2 is turned off, and the second transistor Tmcap can be turned on during the third driving period DP3.

When the second transistor Tmcap is turned on, the capacitance Cvc (hereinafter, simply referred to as the second capacitance C2) of the second transistor Tmcap is greater than the first capacitance C1.

To provide an additional description, the first capacitance C1 of the second transistor Tmcap in the first driving period DP1 and the second driving period DP2 is smaller than the second capacitance C2 of the second transistor Tmcap in the third driving period DP3 through which the data voltage Vdata is transmitted through the data line DL. As show in FIG. 10, a capacitance of the variable capacitor unit VC in the driving period during which the data voltage is supplied to the driving transistor Tdr (e.g., DP3) is greater than a capacitance of the variable capacitor unit VC in other driving periods of the pixel drive circuit (e.g., periods DP1, DP2, DP4, and DP5).

As described above, in the third driving period DP3, the first node N1 is floated, the data voltage Vdata is supplied to the gate of the driving transistor Tdr, and the second capacitance C2 of the second transistor Tmcap has a value greater than the first capacitance C1. That is, in the third driving period DP3, the second capacitance C2 between the anode and cathode of the light emitting device ED has a value greater than the first capacitance C1.

Therefore, the source voltage Vg of the driving transistor Tdr slowly increases as illustrated in FIG. 10.

In this case, the voltage of the first node N1 connected to the source of the driving transistor Tdr and the anode of the light emitting device ED can increase in proportion to the mobility of electric charges (e.g., electrons), and the gate of the driving transistor Tdr can be constantly maintained with the data voltage Vdata.

Accordingly, the influence by the mobility of electric charges can be removed.

For example, when the mobility of electric charges is small, the source voltage Vs of the first node N1 increases gradually, and accordingly, the difference value between the gate and source of the driving transistor increases, and thus a large amount of current flows through the driving transistor during the fifth driving period DP5.

Moreover, when the mobility of electric charges is large, the source voltage Vs of the first node N1 increases rapidly, and accordingly, the difference value between the gate and source of the driving transistor becomes small, and thus a small amount of current flows through the driving transistor during the fifth driving period DP5.

Accordingly, a large current capable of compensating for small mobility can flow to the light emitting device ED, and a small current capable of compensating for large mobility can flow to the light emitting device ED.

Therefore, according to the present disclosure, the light emitting device ED is not affected by mobility during the light emitting period (the fifth period DP5), and the light emitting device ED can output light based on the data voltage Vdata.

Therefore, the third driving period DP3 during which the data is written can be referred to as a mobility compensation period.

The driving transistor Tdr can be turned off at the start of the third driving period DP3, and the driving transistor Tdr can be turned on at the end of the third driving period DP3.

Next, when the fourth driving period DP4 starts, a low-level gate signal GS and a low-level sensing control signal SCS are supplied from the gate driver 200 to the pixel P.

That is, the low-level gate signal GS for turning off the switching transistor Tsw1 and the first transistor Tsw is supplied to the pixel P through the gate line GL in the fourth driving period DP4. The low-level gate signal GS for turning off the switching transistor Tsw1 and the first transistor Tsw denotes the gate-off signal.

The sensing control signal SCS having a high level in the first driving period DP1 has a low level in the second driving period DP2, the third driving period DP3, and the fourth driving period DP4.

The data voltage Vdata supplied from the data driver 300 to the pixel through the data line DL during the third driving period DP3 can be output from the data driver 300 until a portion of the fourth driving period DP4. However, because the switching transistor Tsw1 is turned off by the gate signal GS having the low level during the fourth driving period DP4 as described above, the data voltage Vdata transmitted through the data line DL is not supplied to the gate of the driving transistor Tdr.

The first transistor Tmsw is turned off by the low-level gate signal GS. Accordingly, a voltage is no longer supplied to the gate of the second transistor Tmsw. Accordingly, the second transistor Tmcap is turned off.

Therefore, the capacitance Cvc (hereinafter, simply referred to as the third capacitance C3) of the second transistor Tmcap at the fourth driving period DP4 becomes smaller than the second capacitance C2 of the third driving period DP3, as illustrated in FIG. 10.

When the fourth driving period DP4 starts, the driving transistor Tdr is turned on by the data voltage Vdata. Accordingly, electric charges are supplied from the driving transistor Tdr to the first node N1.

However, the source voltage Vs at the start of the fourth driving period DP4 is lower than the threshold voltage of the light emitting device ED. Accordingly, no current flows through the light emitting device ED, and accordingly, no light is output from the light emitting device ED.

In this case, the source voltage Vs can increase as illustrated in FIG. 10 by the electric charge supplied from the driving transistor Tdr. That is, when the fourth driving period DP4 starts, as the driving transistor Tdr is turned on by the data voltage Vdata, the source voltage Vs can increase.

A storage capacitor Cst is connected between the gate of the driving transistor Tdr and the source of the driving transistor Tdr.

Therefore, when the source voltage Vs increases during the fourth driving period DP4, the gate voltage Vg can also increase.

Moreover, as the gate voltage Vg rises and more electric charges are supplied to the first node N1, the source voltage Vs can further rise.

That is, during the fourth driving period DP4, as the driving transistor Tdr is turned on by the data voltage Vdata, the source voltage Vs rises, as the source voltage Vs rises, the gate voltage Vg rises, and as the gate voltage Vg rises, the source voltage Vs can further rise.

This operation is continued until the source voltage Vs is equal to or greater than the threshold voltage of the light emitting device ED.

This operation is called a source follower operation.

Therefore, the gate voltage Vg and the source voltage Vs can increase at the same rate by the source follower operation during the fourth driving period DP4.

That is, when the gate voltage Vg and the source voltage Vs rise, the difference value between the gate voltage Vg and the source voltage Vs can be maintained as the threshold voltage Vth of the driving transistor Tdr.

To provide an additional description, the gate voltage Vg of the driving transistor Tdr can increase at the same rate together with the source voltage Vs, which is the voltage of the anode, by the source follower operation during the fourth driving period DP4 in which the high-level gate pulse GP is not supplied.

Finally, when the source voltage Vs increased in the fourth driving period DP4 exceeds the threshold voltage of the light emitting device ED, the fifth driving period DP5 starts.

When the fifth driving period DP5 starts, current flows to the light emitting device ED, and accordingly, light can be output from the light emitting device ED.

Therefore, the fifth driving period DP5 can be referred to as a light emitting period.

That is, light can be output from the light emitting device ED in the fifth driving period DP5 during which the source voltage Vs, which is the voltage of the anode, reaches a preset voltage. The preset voltage can be a threshold voltage of the light emitting device ED.

In this case, the luminance of light output from the light emitting device ED can be determined by the data voltage Vdata, and the threshold voltage Vth of the driving transistor Tdr and the mobility of electric charges do not affect the luminance of light output from the light emitting device ED.

For example, as described with reference to the second driving period DP2, because the first capacitance C1, which is a capacitance between the anode and cathode of the light emitting device ED, has a value of 0 or very small in the second driving period DP2, the source voltage Vs quickly increases in the second driving period DP2. Particularly, the source voltage Vs can increase until the difference between the gate voltage Vg and the source voltage Vs in the second driving period DP2 becomes the threshold voltage Vth of the driving transistor Tdr, as illustrated in FIGS. 10 and 11.

That is, the source voltage Vs can increase to a level VL obtained by subtracting the threshold voltage Vth from the gate voltage Vg in the second driving period DP2.

Accordingly, the threshold voltage Vth of the driving transistor Tdr can be excluded from the formula for calculating the current flowing to the light emitting device ED.

This means that the threshold voltage Vth of the driving transistor Tdr does not affect the current flowing to the light emitting device ED in the fifth driving period DP5.

Also, as described with reference to the third driving period DP3, because the second capacitance C2, which is the capacitance between the anode and cathode of the light emitting device ED, has a value greater than the first capacitance C1 in the third driving period DP3, the source voltage Vs can increase continuously without saturation to a specific voltage in the third driving period DP3, as illustrated in FIGS. 10 and 11.

In particular, when the mobility of electric charges is small in the third driving period DP3, the source voltage Vs gradually increases, and accordingly, the difference value between the gate voltage Vg and source voltage Vs of the driving transistor Tdr increases, and thus, a large amount of current can flow through the driving transistor Tdr in the fifth driving period DP5. Also, when the mobility of electric charges in the third driving period DP3 is large, the source voltage Vs increases rapidly, and accordingly, the difference value between the gate voltage Vg and source voltage Vs of the driving transistor Tdr decreases, and thus, a small current can flow through the driving transistor Tdr in the fifth driving period DP5.

This means that the mobility of electric charges does not affect the current flowing to the light emitting device ED in the fifth driving period DP5.

As described above, according to the light emitting display apparatus according to the present disclosure, the capacitance Cvs between the anode and the cathode can decrease in the second driving period DP2 for compensating the threshold voltage Vth, and can increase in the third driving period DP3 for compensating for mobility. That is, the second transistor Tmacp can function as a variable capacitor.

Accordingly, the source voltage Vs can be rapidly increased during the second driving period DP2, such that threshold voltage compensation can be quickly performed. Therefore, the light emitting device can quickly output light.

Also, the source voltage Vs can gradually increase during the third driving period DP3, and in particular, the source voltage Vs can increase in proportion to the mobility. Accordingly, the magnitude of the current supplied to the light emitting device ED during the fifth driving period DP5 can depend only on the data voltage Vdata regardless of the mobility. Accordingly, the luminance of light output from the light emitting device can be increased or decreased only by the data voltage Vdata.

Figure 12:
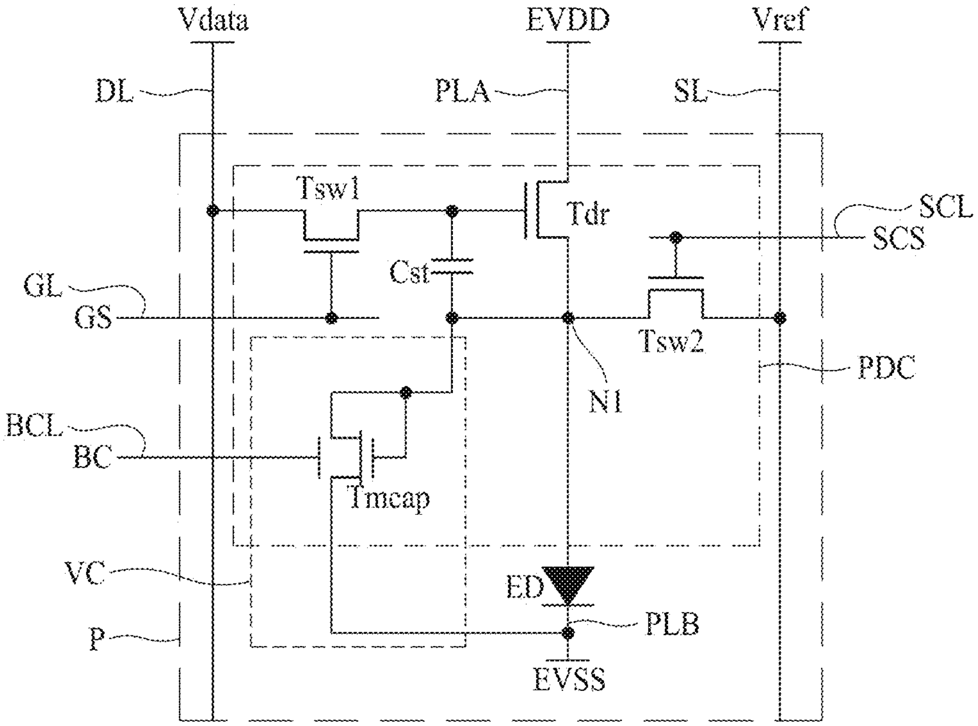
FIG. 12 is another exemplary diagram illustrating a structure of a pixel applied to a light emitting display apparatus according to an embodiment of the present disclosure.

FIG. 12 is another exemplary diagram illustrating a structure of a pixel applied to a light emitting display apparatus according to an embodiment of the present disclosure. In the following descriptions, details which are the same as or similar to details described with reference to FIGS. 1 to 11 are omitted or will be simply described.

The pixel P applied to a light emitting display apparatus according to an embodiment of the present disclosure includes the light emitting device ED and the pixel driving circuit PDC, as described above. The pixel driving circuit PDC is connected to a gate line GL, a data line DL, and a light emitting device ED.

The pixel driving circuit PDC includes a driving transistor Tdr connected between the first voltage supply line PLA supplied with the first voltage EVDD and the light emitting device ED, and a variable capacitor unit VC connected between the anode and cathode of the light emitting device ED, as illustrated in FIGS. 2 and 12.

In addition, the pixel driving circuit can further include the switching transistor Tsw1, the storage capacitor Cst, and the sensing transistor Tsw2.

In particular, the variable capacitor unit VC (e.g., a variable capacitor circuit) is connected to the anode and cathode of the light emitting device ED.

The capacitance of the variable capacitor unit VC can be changed depending on the driving period. For example, the capacitance of the variable capacitor unit VC can have different values in various driving periods for driving the light emitting device ED.

To this end, the variable capacitor unit VC includes a control transistor Tmcap, as illustrated in FIG. 12. The control transistor Tmcap illustrated in FIG. 12 can perform the same or similar functions as the second transistor illustrated in FIG. 6. Accordingly, the control transistor is represented by Tmcap, which is a reference numeral of the second transistor.

A first terminal of the control transistor Tmcap is connected to the anode of the light emitting device ED. The anode means the first node N1, and the first node N1 is connected to the second terminal of the driving transistor Tdr. The second terminal of the driving transistor Tdr can be a source.

A second terminal of the control transistor Tmcap is connected to the cathode of the light emitting device ED.

The control transistor Tmcap has a double gate structure including two gates, and a first gate of the two gates is connected to the first terminal of the control transistor Tmcap.

A second gate of the two gates forming the double gate structure is connected to a body control line BCL. A body control signal BC can be supplied through the body control line BCL.

The body control line BCL can be connected to the gate driver 200.

That is, in a light emitting display apparatus according to the present disclosure, the gate driver 200 can generate the body control signal BC and supply the body control signal BC to the control transistor Tmcap through the body control line BCL.

To this end, the gate driver 200 can include a stage for generating the body control signal BC and a stage for generating the gate signal GS. However, the body control signal BC can be generated in the stage for generating the gate signal GS. In one embodiment, the body control signal BC controls the turn on and turn off the control transistor Tmcap.

To provide an additional description, the turn-on and turn-off of the control transistor Tmcap can be controlled by the body control signal BC generated by the gate driver 200.

The first terminal of the control transistor Tmcap is connected to the first node N1, and a gate of the control transistor Tmcap is connected to the first terminal of the control transistor Tmcap. That is, the first terminal of the control transistor Tmcap and the gate of the control transistor Tmcap are connected.

The second terminal of the control transistor Tmcap is connected to the cathode of the light emitting device ED.

This structure is called a diode connection structure.

Due to the diode connection structure, the control transistor Tmcap can perform a function of a capacitor.

For example, when the control transistor Tmcap is a metal oxide semiconductor field effect transistor (MOSFET), the control transistor Tmcap can function as a capacitor, and thus the control transistor Tmcap can become a MOS capacitor.

Particularly, the capacitance when the control transistor Tmcap having the diode connection structure is turned on can be greater than the capacitance when the control transistor Tmcap is turned off.

Therefore, in a light emitting display apparatus according to the present disclosure, the control transistor Tmcap having the diode connection structure can function as a variable capacitor.

Another reason why the control transistor Tmcap can function as a variable capacitor in a light emitting display apparatus according to the present disclosure is that the threshold voltage of the control transistor Tmcap is different from the threshold voltage of the switching transistor Tsw1, the threshold voltage of the driving transistor Tdr, and the threshold voltage of the sensing transistor Tsw2. In particular, when the control transistor Tmcap, the switching transistor Tsw1, the driving transistor Tdr, and the sensing transistor Tsw2 are N-type transistors, the threshold voltage of the control transistor Tmcap can be greater than the threshold voltage of the switching transistor Tsw1, the threshold voltage of the sensing transistor Tsw2, and the threshold voltage of the driving transistor Tdr.

For example, the first graph X1 illustrated in FIG. 7 is a graph showing drain-source current according to gate-source voltage of an N-type metal oxide semiconductor field effect transistor (MOSFET), and the second graph X2 illustrated in FIG. 7 is another graph showing drain-source current according to gate-source voltage of the N-type MOSFET.

In this case, the first graph X1 can be a graph showing the drain-source current Ids according to the gate-source voltage Vgs of at least one of the switching transistor Tsw1, the driving transistor Tdr, and the sensing transistor Tsw2. Hereinafter, for convenience of description, the first graph X1 is a graph showing the drain-source current according to the gate-source voltage of the driving transistor Tdr.

Also, the second graph X2 can be a graph showing the drain-source current Ids according to the gate-source voltage Vgs of the control transistor Tmcap.

In this case, the threshold voltage Vth2 of the control transistor Tmcap is more moved in the positive direction than the threshold voltage Vth1 of the driving transistor Tdr.

This means that in order to turn on the control transistor Tmcap, a voltage greater than the voltage for turning on the driving transistor Tdr or the sensing transistor Tsw2 is required.

To provide an additional description, in FIG. 12, when the sensing transistor Tsw2 is turned on, the initialization voltage Vref supplied to the sensing transistor Tsw2 can be supplied to the gate of the control transistor Tmcap.

In this case, the initialization voltage Vref supplied to the gate of the control transistor Tmcap can be set to be lower than the threshold voltage Vth2 of the control transistor Tmcap, and thus, the control transistor Tmcap is not turned on by the initialization voltage Vref.

However, when the body control signal BC capable of turning on the control transistor Tmcap is supplied to the gate of the control transistor Tmcap, the control transistor Tmcap can be turned on.

That is, when the body control signal BC greater than or equal to the threshold voltage of the control transistor Tmcap is supplied to the gate of the control transistor Tmcap, the control transistor Tmcap can be turned on.

In this case, the body control signal BC capable of turning on the control transistor Tmcap may be a voltage greater than the threshold voltage of the driving transistor Tdr.

To provide an additional description, in a light emitting display apparatus according to an embodiment of the present disclosure, when the switching transistor Tsw1, the sensing transistor Tsw2, the driving transistor Tdr, and the control transistor Tmcap are N-type transistors and the threshold voltage Vth2 of the control transistor Tsw1 is greater than the threshold voltage of the switching transistor Tsw1, the threshold voltage of the sensing transistor Tsw2, and the threshold voltage Vth1 of the driving transistor Tdr, the control transistor Tmcap can perform a function of a variable capacitor.

Various methods described with reference to FIGS. 8 and 9 can be used to form the threshold voltage Vth2 of the control transistor Tmcap provided in the light emitting display panel 100 to be greater than the threshold voltage of the switching transistor Tsw1, the threshold voltage of the sensing transistor Tsw2, and the threshold voltage Vth1 of the driving transistor Tdr.

For example, as described with reference to FIGS. 8 and 9, when the thickness of the gate insulation film GIL2 of the control transistor Tmcap is greater than the thickness of the gate insulation layer of the switching transistor Tsw1, the thickness of the gate insulation layer of the sensing transistor Tsw2, and the thickness of the gate insulation layer of the driving transistor Tdr, the threshold voltage Vth2 of the control transistor Tmcap can be further moved in the positive direction than the threshold voltage of the switching transistor Tsw1, the threshold voltage of the sensing transistor Tsw2, and the threshold voltage Vth1 of the driving transistor Tsdr.

Accordingly, the control transistor Tmcap can perform a function of a variable capacitor.

A specific method in which the control transistor Tmcap performs the function of a variable capacitor will be described with reference to FIG. 13.

Figure 13:
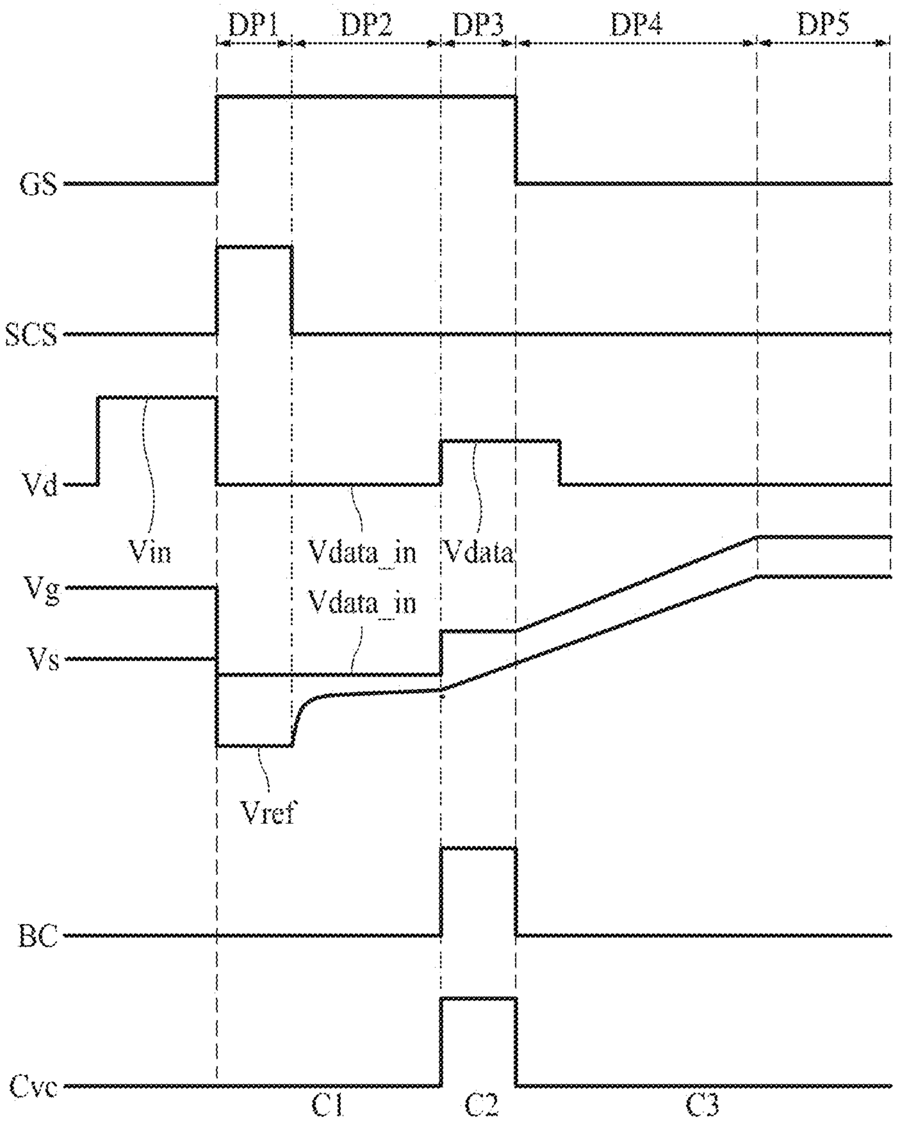
FIG. 13 is an exemplary diagram illustrating signals applied to driving of a pixel illustrated in FIG. 12 apparatus according to an embodiment of the present disclosure.

FIG. 13 is an exemplary diagram illustrating signals applied to driving of a pixel illustrated in FIG. 12. In the following descriptions, details which are the same as or similar to details described with reference to FIGS. 1 to 12 are omitted or simply described.

First, when the first driving period DP1 starts, a high-level gate signal GS, a high-level sensing control signal SCS, and a low-level body control signal BC are supplied from the gate driver 200 to the pixel P.

For example, as described above, the gate driver 200 can generate the gate signal GS and can generate the sensing control signal SCS in the same or similar method as or to the method of generating the gate signal GS. Also, the gate driver 200 can generate the body control signal BC in the same or similar method as or to the method of generating the gate signal GS.

To this end, the gate driver 200 can include a stage for generating the sensing control signal SCS, a stage for generating the body control signal BC, and a stage for generating the gate signal GS. However, at least one of the sensing control signal SCS and the body control signal BC can be generated in the stage for generating the gate signal GS. An initial data voltage can be supplied through the data line DL, immediately before the first driving period 1DP starts. Accordingly, the data line DL can be initialized to the initial voltage Vin.

The switching transistor Tsw1 is turned on by the high-level gate signal GS, the sensing transistor Tsw2 is turned on by the high-level sensing control signal SCS, and the control transistor Tmcap is turned off by the low-level body control signal BC.

In this case, the initial data voltage Vdata_in can be supplied from the data line initialized by the initial voltage Vin just before the first driving period DP1 to the gate of the driving transistor Tdr through the switching transistor Tsw1.

Accordingly, the gate of the driving transistor Tdr can be initialized by the initial data voltage Vdata_in. That is, as illustrated in FIG. 13, the gate voltage (hereinafter, simply referred to as the gate voltage Vg) of the driving transistor Tdr can include the initial data voltage Vdata_in.

The initial data voltage Vdata_in can be set to be lower than the threshold voltage of the light emitting device ED.

In the first driving period DP1, the anode of the light emitting device ED and the second terminal of the driving transistor Tdr can be initialized by an initialization voltage Vref supplied through the turned-on sensing transistor Tsw2.

As described above, the node to which the anode and the second terminal of the driving transistor are connected is referred to as the first node N1.

When the driving transistor Tdr is, as illustrated in FIG. 12, an N-type transistor, the second terminal of the driving transistor Tdr can be a source of the driving transistor Tdr. The source of the driving transistor Tdr is connected to the anode.

Therefore, as illustrated in FIG. 13, a source voltage (hereinafter, simply referred to as the source voltage Vs) of the driving transistor Tdr can include the initialization voltage Vref.

That is, in the first driving period DP1, the gate of the driving transistor Tdr can be initialized by the initial data voltage Vdata_in, and the source of the driving transistor Tdr can be initialized to the initialization voltage Vref.

Therefore, the first driving period DP1 can be referred to as an initialization period.

In this case, the control transistor Tmcap is turned off by the low-level body control signal BC.

Accordingly, the initialization voltage Vref supplied to the first node N1 can be supplied to the first terminal and gate of the control transistor Tmcap. Here, when the control transistor Tmcap is, as illustrated in FIG. 12, an N-type, the first terminal of the control transistor Tmcap can be a drain.

That is, the control transistor Tmcap has the diode connection structure in which the drain and gate of the control transistor Tmcap are connected.

In this case, the control transistor Tmcap can be formed such that the threshold voltage of the control transistor Tmcap is shifted more in the positive direction than the threshold voltage of the switching transistor Tsw1, the threshold voltage of the sensing transistor Tsw2, and the threshold voltage of the driving transistor Tdr, as described with reference to FIG. 7.

In particular, the control transistor Tmcap can be formed not to be turned on by the initialization voltage Vref. Accordingly, even if the initialization voltage Vref is supplied to the gate of the control transistor Tmcap during the first driving period DP1, the control transistor Tmcap is not turned on.

Because the control transistor Tmcap is not turned on, the capacitance Cvc of the control transistor Tmcap has a value of 0 or a very small value.

Next, when the second driving period DP2 starts, a high-level gate signal GS, a low-level sensing control signal SCS, and a low-level body control signal BC are supplied from the gate driver 200 to the pixel P.

That is, the high-level gate signal GS is supplied to the pixel P through the gate line GL during the first driving period DP1 and the second driving period DP2.

Moreover, the low-level body control signal BC is supplied to the pixel P through the body control line BCL during the first driving period DP1 and the second driving period DP2.

However, the sensing control signal SCS having a high level in the first driving period DP1 has a low level in the second driving period DP2.

The switching transistor Tsw1 is turned on by the high-level gate signal GS, the sensing transistor Tsw2 is turned off by the low-level sensing control signal SCS, and the control transistor Tmcap is turned off by the low-level body control signal BC.

The gate voltage Vg of the driving transistor Tdr in the second driving period DP2 can be the same as the gate voltage Vg of the driving transistor Tdr in the first driving period DP1. That is, the gate voltage Vg of the driving transistor Tdr in the second driving period DP2 can include the initial data voltage Vdata_in.

In the second driving period DP2, the sensing transistor Tsw2 is turned off, and thus the first node N1 is floated.

The control transistor Tmcap is turned off by the low-level body control signal BC. Accordingly, the control transistor Tmcap maintains the turned-off state from the first driving period DP1 to the second driving period DP2.

Therefore, the capacitance Cvc of the control transistor Tmcap has a value of 0 or a very small value.

As described above, the voltage of the first node N1 is the source voltage Vs of the driving transistor Tdr.

The first node N1 is floated during the second driving period DP2, and the capacitance Cvc of the control transistor Tmcap has a value of 0 or a very small value. That is, the capacitance Cvc between the anode and cathode of the light emitting device ED has a value of 0 or a very small value. Accordingly, after the source voltage Vg of the driving transistor Tdr is rapidly increased, as illustrated in FIG. 13, the source voltage Vg can be saturated to a specific value.

In particular, the source voltage Vs can rise until the difference between the gate voltage Vg and the source voltage Vs becomes the threshold voltage Vth of the driving transistor Tdr in the second driving period DP2.

that is, the source voltage Vs can increase to a level obtained by subtracting the threshold voltage Vth from the gate voltage Vg in the second driving period DP2. More specifically, during the second period DP2, the first node N1 is floated, the control transistor Tmcap can perform the function of a capacitor, and the capacitance Cvc of the control transistor Tmcap has a very small value.

Accordingly, when the second driving period DP2 is started and the driving transistor Tdr is turned on, the source voltage Vg of the driving transistor Tdr is rapidly increased by the control transistor Tmcap having a small capacitance Cvc, and at the end of the second period DP2, the source voltage Vs can include a difference value Vs=Vg-Vth between the gate voltage Vg of the driving transistor Tdr and the threshold voltage Vth of the driving transistor Tdr.

That is, at the end of the second driving period DP2, the difference value (hereinafter, simply referred to as the gate-source voltage Vgs) between the gate voltage Vg and source voltage Vs of the driving transistor Tdr can be the threshold voltage Vth of the driving transistor. Accordingly, at the end of the second period DP2, the driving transistor Tdr is turned off.

For example, the luminance of light output in a light emitting period (the fifth driving period DP5) can be determined by the magnitude of the current supplied to the light emitting device ED.

As described above, in the second driving period DP2, the source voltage Vs can include a difference value (Vs=Vg−Vth) between the gate voltage Vg and the threshold voltage Vth.

Therefore, when the difference voltages between the gate-source voltage Vgs and the threshold voltage Vth in the second driving period DP2 are expressed only using the gate voltage Vg, the source voltage Vs, and the threshold voltage Vth, the difference voltage between the gate-source voltage Vgs and the threshold voltage Vth becomes [Vg−(Vg−Vth)]−Vth=0.

Therefore, the difference voltage between the gate-source voltage Vgs and the threshold voltage Vth in the second driving period DP2 is not affected by the threshold voltage.

To provide an additional description, the capacitance Cvc (hereinafter, simply referred to as the first capacitance C1) of the control transistor Tmcap has a very small value in the first driving period DP1 and the second driving period DP2. Accordingly, the source voltage Vs, which is the voltage of the floated first node N1, can quickly rise from the initialization voltage Vref to be a value including a difference value (Vs=Vg−Vth) between the gate voltage Vg and the threshold voltage Vth.

In this case, the threshold voltage Vth of the driving transistor Tdr is not included in the difference voltage between the gate-source voltage Vgs and the threshold voltage Vth. Therefore, even in the third to fifth driving periods DP3 to DP5 thereafter, the threshold voltage Vth is not included in the calculation equation of the current Ids flowing through the light emitting device ED.

Therefore, the luminance of light output from the light emitting device ED in the light emitting period (the fifth driving period DP5) is not affected by the threshold voltage Vth of the driving transistor Tdr.

Accordingly, the second driving period DP2 can be referred to as a threshold voltage compensation period.

That is, according to the present disclosure, because the first capacitance C1 of the control transistor Tmcap is very small in the second driving period DP2, the source voltage Vs is rapidly increased, and in particular, the source voltage Vs can be rapidly increased until the difference voltage between the source voltage Vs and the gate voltage Vg becomes the threshold voltage Vth of the driving transistor Tdr.

In this case, the threshold voltage Vth can be removed from the formula for calculating the current Ids flowing through the light emitting device ED.

Accordingly, even if the threshold voltage Vth of the driving transistor Tdr is changed due to the continuous use of the light emitting display apparatus, the luminance of light output from the light emitting device ED may not be affected by the threshold voltage Vth.

Next, when the third driving period DP3 starts, a high-level gate signal GS, a low-level sensing control signal SCS, and a high-level body control signal BC are supplied from the gate driver 200 to the pixel P, and a data voltage Vdata is supplied from the data driver 300 to the gate of the driving transistor Tdr through the data line DL and the switching transistor Tsw.

That is, the high-level gate signal GS for turning on the switching transistor Tsw1 is supplied to the pixel P through the gate line GL in the first driving period DP1, the second driving period DP2, and the third driving period DP3. The high-level gate signal GS for turning on the switching transistor Tsw1 means the gate pulse GP.

However, the sensing control signal SCS having a high level in the first driving period DP1 has a low level in the second driving period DP2 and the third driving period DP3.

The body control signal BC having a low level in the first driving period DP1 and the second driving period DP2 has a high level in the third driving period DP3.

The switching transistor Tsw1 is turned on by the high-level gate signal GS, the sensing transistor Tsw2 is turned off by the low-level sensing control signal SCS, and the control transistor Tmcap is turned on by the high-level body control signal BC.

The gate voltage Vg of the driving transistor Tdr in the third driving period DP3 can include the data voltage Vdata. As described above, the initial voltage Vin, the data initialization voltage Vdata_in, and the data voltage Vdata can be supplied through the data line DL. Accordingly, the initial voltage Vin, the data initialization voltage Vdata_in, and the data voltage Vdata can be collectively referred to as the data line voltage Vd.

In the third driving period DP3, the sensing transistor Tsw2 is turned off, and thus the first node N1 is floated.

The storage capacitor Cst is connected between the gate of the driving transistor Tdr and the source of the driving transistor Tdr.

Accordingly, in the third driving period DP3, as the gate voltage Vg is increased to the data voltage Vdata, the source voltage Vs can also be increased. As described above, when the third driving period DP3 is started, the high-level body control signal BC is supplied to the gate of the control transistor Tmcap. Accordingly, the control transistor Tmcap is turned on.

To this end, the high level of the body control signal BC can be set to a value capable of turning on the control transistor Tmcap.

To provide an additional description, the control transistor Tmcap can be turned off during the first driving period DP1 and the second driving period DP2 during which the sensing transistor Tsw2 is turned off, and the control transistor Tmcap can be turned on in the third driving period DP3.

When the control transistor Tmcap is turned on, the capacitance Cvc (hereinafter, simply referred to as the second capacitance C2) of the control transistor Tmcap is greater than the first capacitance C1.

To provide an additional description, the first capacitance C1 of the control transistor Tmcap in the first driving period DP1 and the second driving period DP2 is smaller than the second capacitance C2 of the control transistor Tmcap in the third driving period DP3 in which the data voltage Vdata is transmitted through the data line DL.

As described above, in the third driving period DP3, the first node N1 is floated, the data voltage Vdata is supplied to the gate of the driving transistor Tdr, and the second capacitance C2 of the control transistor Tmcap has a value greater than the first capacitance C1. That is, in the third driving period DP3, the second capacitance C2 between the anode and cathode of the light emitting device ED has a value greater than the first capacitance C1. As show in FIG. 13, a capacitance of the variable capacitor unit VC in the driving period during which the data voltage is supplied to the driving transistor Tdr (e.g., DP3) is greater than a capacitance of the variable capacitor unit VC in other driving periods of the pixel drive circuit (e.g., periods DP1, DP2, DP4, and DP5).

Therefore, the source voltage Vg of the driving transistor Tdr slowly increases as illustrated in FIG. 13.

In this case, the voltage of the first node N1 connected to the source of the driving transistor Tdr and the anode of the light emitting device ED can increase in proportion to the mobility of electric charges (e.g., electrons), and the gate of the driving transistor Tdr can be constantly maintained with the data voltage Vdata.

Accordingly, the influence by the mobility of electric charges can be removed.

For example, when the mobility of electric charges is small, the source voltage Vs of the first node N1 gradually increases, and accordingly, the difference value between the gate and source of the driving transistor becomes large, and thus a large amount of current flows through the driving transistor in the fifth driving period DP5.

Moreover, when the mobility of electric charges is large, the source voltage Vs of the first node N1 increases rapidly, and accordingly, the difference value between the gate and source of the driving transistor becomes small, and thus a small amount of current flows through the driving transistor in the fifth driving period DP5.

Accordingly, a large current capable of compensating for the small mobility can flow to the light emitting device ED, and a small current capable of compensating for the large mobility can flow to the light emitting device ED.

Therefore, according to the present disclosure, the light emitting device ED is not affected by mobility in the light emitting period (the fifth period DP5), and the light emitting device ED can output light based on the data voltage Vdata.

Therefore, the third driving period DP3 can be referred to as a mobility compensation period.

The driving transistor Tdr can be turned off at the start of the third driving period DP3, and the driving transistor Tdr can be turned on at the end of the third driving period DP3.

Next, when the fourth driving period DP4 starts, a low-level gate signal GS, a low-level sensing control signal SCS, and a low-level body control signal BC are supplied from the gate driver 200 to the pixel P.

That is, the low-level gate signal GS for turning off the switching transistor Tsw1 is supplied to the pixel P through the gate line GL in the fourth driving period DP4. The low-level gate signal GS for turning off the switching transistor Tsw1 means a gate-off signal.

The sensing control signal SCS having a high level in the first driving period DP1 has a low level in the second driving period DP2, the third driving period DP3, and the fourth driving period DP4.

The body control signal BC having a high level in the third driving period DP3 has a low level in the fourth driving period DP4.

The data voltage Vdata supplied from the data driver 300 to the pixel through the data line DL in the third driving period can be output from the data driver 300 until a partial period of the fourth driving period DP4. However, because the switching transistor Tsw1 is, as described above, turned off by the gate signal GS having the low level in the fourth driving period DP4, the data voltage Vdata transmitted through the data line DL is not supplied to the gate of the driving transistor Tdr.

The control transistor Tmcap is turned off by the low-level body control signal BC.

Therefore, the capacitance Cvc (hereinafter, simply referred to as the third capacitance C3) of the control transistor Tmcap in the fourth driving period DP4 becomes smaller than the second capacitance C2 in the third driving period DP3, as illustrated in FIG. 13.

When the fourth driving period DP4 starts, the driving transistor Tdr is turned on by the data voltage Vdata. Accordingly, electric charges are supplied from the driving transistor Tdr to the first node N1.

However, the source voltage Vs at the start of the fourth driving period DP4 is lower than the threshold voltage of the light emitting device ED. Accordingly, no current flows through the light emitting device ED, and accordingly, no light is output from the light emitting device ED.

In this case, the source voltage Vs can increase as illustrated in FIG. 13 by the electric charge supplied from the driving transistor Tdr. That is, when the fourth driving period DP4 starts, as the driving transistor Tdr is turned on by the data voltage Vdata, the source voltage Vs can increase.

A storage capacitor Cst is connected between the gate of the driving transistor Tdr and the source of the driving transistor Tdr.

Therefore, when the source voltage Vs increases during the fourth driving period DP4, the gate voltage Vg can also increase.

Moreover, as the gate voltage Vg rises and more electric charges are supplied to the first node N1, the source voltage Vs can further rise.

That is, in the fourth driving period DP4, as the driving transistor Tdr is turned on by the data voltage Vdata, the source voltage Vs rises, the gate voltage Vg rises as the source voltage Vs rise, and the source voltage Vs can rise further as the gate voltage Vg rises.

This operation is continued until the source voltage Vs is equal to or greater than the threshold voltage of the light emitting device ED.

This operation is called a source follower operation.

Therefore, the gate voltage Vg and the source voltage Vs can increase at the same rate by the source follower operation in the fourth driving period DP4.

That is, when the gate voltage Vg and the source voltage Vs rise, the difference value between the gate voltage Vg and the source voltage Vs can be maintained with the threshold voltage Vth of the driving transistor Tdr.

To provide an additional description, the gate voltage Vg of the driving transistor Tdr can increase at the same rate together with the source voltage Vs, which is the voltage of the anode, by the source follower operation in the fourth driving period DP4 in which the high-level gate pulse GP is not supplied.

Finally, when the source voltage Vs increased in the fourth driving period DP4 exceeds the threshold voltage of the light emitting device ED, the fifth driving period DP5 starts.

When the fifth driving period DP5 starts, current flows through the light emitting device ED, and accordingly, light can be output from the light emitting device ED.

Therefore, the fifth driving period DP5 can be referred to as a light emitting period That is, light can be output from the light emitting device ED during the fifth driving period DP5 in which the source voltage Vs, which is the voltage of the anode, reaches a preset voltage. The preset voltage can be a threshold voltage of the light emitting device ED.

In this case, the luminance of light output from the light emitting device ED can be determined by the data voltage Vdata, and the threshold voltage Vth of the driving transistor Tdr and the mobility of electric charges do not affect the luminance of light output from the light emitting device ED.

For example, as described with reference to the second driving period DP2, because the first capacitance C1, which is a capacitance between the anode and cathode of the light emitting device ED in the second driving period DP2, has a value of 0 or very small, the source voltage Vs rapidly increases in the second driving period DP2. In particular, the source voltage Vs can increase until the difference between the gate voltage Vg and the source voltage Vs in the second driving period DP2 becomes the threshold voltage Vth of the driving transistor Tdr, as illustrated in FIGS. 11 and 13.

That is, the source voltage Vs can increase to a level VL obtained by subtracting the threshold voltage Vth from the gate voltage Vg in the second driving period DP2.

Accordingly, the threshold voltage Vth of the driving transistor Tdr can be excluded from the formula for calculating the current flowing through the light emitting device ED.

This means that the threshold voltage Vth of the driving transistor Tdr does not affect the current flowing through the light emitting device ED in the fifth driving period DP5.

Also, as described with reference to the third driving period DP3, because the second capacitance C2, which is the capacitance between the anode and cathode of the light emitting device ED in the third driving period DP3, has a value greater than the first capacitance C1, the source voltage Vs can increase continuously without saturation to a specific voltage in the third driving period DP3, as illustrated in FIGS. 11 and 13.

Particularly, when the mobility of electric charges is small in the third driving period DP3, the source voltage Vs gradually increases, and accordingly, the difference value between the gate voltage Vg and source voltage Vs of the driving transistor Tdr becomes large, so that a large amount of current can flow through the driving transistor Tdr in the fifth driving period DP5.

Moreover, when the mobility of electric charges is high in the third driving period DP3, the source voltage Vs increases rapidly, and accordingly, the difference value between the gate voltage Vg and source voltage Vs of the driving transistor Tdr becomes small, so that a small amount of current can flow through the driving transistor Tdr in the fifth driving period DP5.

This means that the mobility of electric charges does not affect the current flowing to the light emitting device ED in the fifth driving period DP5.

As described above, according to a light emitting display apparatus according to the present disclosure, the capacitance Cvs between the anode and the cathode can decrease in the second driving period DP2 for compensating the threshold voltage Vth, and can increase in the third driving period DP3 for compensating for mobility. That is, the control transistor Tmacp can perform a function as a variable capacitor.

Therefore, the source voltage Vs can be rapidly increased in the second driving period DP2, such that threshold voltage compensation can be quickly performed. Thus, the light emitting device can quickly output light.

Also, the source voltage Vs can gradually increase in the third driving period DP3, and particularly, the source voltage Vs can increase in proportion to the mobility. Accordingly, the magnitude of the current supplied to the light emitting device ED in the fifth driving period DP5 can depend only on the data voltage Vdata regardless of the mobility. Accordingly, the luminance of light output from the light emitting device can be increased or decreased only by the data voltage Vdata.

As described above, in a light emitting display apparatus according to the present disclosure, the first capacitance C1 of the variable capacitor unit VC in the first driving period DP1 and the second driving period DP2 is smaller than the second capacitance C2 of the variable capacitor unit VC in the third driving period DP3 in which the data voltage Vdata is transmitted through the data line DL.

Accordingly, in the first driving period DP1, the influence by the threshold voltage of the driving transistor Tdr can be removed, and in the third driving period DP3, the influence by the mobility of electric charges can be removed.

The gate pulse GP for turning on the switching transistor Tsw1 provided between the driving transistor Tdr and the data line DL can be supplied from the first driving period DP1 to the third driving period DP3.

In the fourth driving period DP4 in which the gate pulse GP is not supplied, the voltage of the gate of the driving transistor Tdr can increase together with the voltage of the anode of the light emitting device ED. That is, in the fourth driving period DP4, the gate voltage Vg and the source voltage Vs can increase at the same rate by the source follower operation.

Light can be output from the light emitting device ED in the fifth driving period DP5 during which the voltage of the anode reaches a preset voltage. The preset voltage can be a threshold voltage of the light emitting device ED.

The third capacitance C3 of the variable capacitor unit VC in the fourth driving period DP4 is smaller than the first capacitance C1 in the third driving period DP3.

The sensing transistor Tsw1 can be turned on in the first driving period DP1 to initialize the anode. That is, the sensing transistor Tsw1 can be turned on in the first driving period DP1, and can be turned off in the second driving period DP2 and the third driving period DP3.

The features of the light emitting display apparatus according to an embodiment of the present disclosure are briefly summarized as follows.

A light emitting display apparatus according to an embodiment of the present disclosure includes a light emitting device; and a pixel drive circuit connected to a gate line, a data line, and the light emitting device, wherein the pixel drive circuit includes: a driving transistor connected between a first voltage supply line to which a first voltage is supplied and the light emitting device; and a variable capacitor unit connected between an anode and a cathode of the light emitting device, and a capacitance of the variable capacitor unit varies depending on a driving period.

The variable capacitor unit includes: a first transistor; and a second transistor, a first terminal of the first transistor is connected to a first terminal and a gate of the second transistor, a second terminal of the first transistor is connected to the anode, and a gate of the first transistor is connected to the gate line, and a first terminal of the second transistor is connected to the first terminal of the first transistor, a second terminal of the second transistor is connected to the cathode, and a gate of the second transistor is connected to the first terminal of the first transistor.

The gate line is connected to a gate of a switching transistor connected between the gate of the driving transistor and the data line.

When the first transistor and the second transistor are N-type transistors, a threshold voltage of the second transistor is greater than a threshold voltage of the first transistor and a threshold voltage of the driving transistor.

The first transistor includes a first active, a first gate electrode, and a first gate insulation layer provided between the first active and the first gate electrode, the second transistor includes a second active, a second gate electrode, and a second gate insulation layer provided between the second active and the second gate electrode, and a thickness of the second gate insulation layer is greater than a thickness of the first gate insulation layer.

A first capacitance of the second transistor in a first driving period and a second driving period is smaller than a second capacitance of the second transistor in a third driving period in which a data voltage is transmitted through the data line, and a gate pulse for turning on the first transistor is supplied through the gate line from the first driving period to the third driving period.

In a fourth driving period in which the gate pulse is not supplied, a voltage of a gate of the driving transistor rises together with a voltage of the anode.

Light is output from the light emitting device in a fifth driving period in which a voltage of the anode reaches a preset voltage.

A third capacitance of the second transistor in the fourth driving period is smaller than the second capacitance in the third driving period.

The light emitting display apparatus further includes a sensing transistor, wherein a first terminal of the sensing transistor is connected to the anode, a second terminal of the sensing transistor is connected to a sensing line to which an initialization voltage is supplied, and a gate of the sensing transistor is connected to a sensing control line to which a sensing control signal is supplied, and the sensing transistor is turned on in the first driving period and the anode is initialized.

The second transistor is turned off in the first driving period and the second driving period in which the sensing transistor is turned off, and the second transistor is turned on in the third driving period.

The variable capacitor unit includes a control transistor, a first terminal of the control transistor is connected to the anode, a second terminal of the control transistor is connected to the cathode, and the control transistor has a double gate structure including two gates, and a first gate of the two gates is connected to the first terminal of the control transistor.

A second gate of the two gates is connected to a body control line.

A first capacitance of the control transistor in a first driving period and a second driving period is smaller than a second capacitance of the control transistor in a third driving period in which a data voltage is transmitted through the data line, a gate pulse for turning on a switching transistor provided between the driving transistor and the data line is supplied from the first driving period to the third driving period, and a body control pulse for turning on the control transistor is supplied through the body control line in the third driving period.

In a fourth driving period in which the gate pulse is not supplied, a voltage of a gate of the driving transistor rises together with a voltage of the anode.

Light is output from the light emitting device in a fifth driving period in which a voltage of the anode reaches a preset voltage.

A third capacitance of the control transistor in the fourth driving periods is smaller than the second capacitance in the third driving periods.

The light emitting display apparatus further includes a sensing transistor, wherein a first terminal of the sensing transistor is connected to the anode, a second terminal of the sensing transistor is connected to a sensing line to which an initialization voltage is supplied, and a gate of the sensing transistor is connected to a sensing control line to which a sensing control signal is supplied, and the sensing transistor is turned on in the first driving period and the anode is initialized.

The control transistor is turned off in the first driving period and the second driving period in which the sensing transistor is turned off, and the control transistor is turned on in the third driving period.

A first capacitance of the variable capacitor unit in a first driving period and a second driving period is smaller than a second capacitance of the variable capacitor unit in a third driving period in which a data voltage is transmitted through the data line, and a gate pulse for turning on a switching transistor provided between the driving transistor and the data line is supplied from the first driving period to the third driving period.

In a fourth driving period when the gate pulse is not supplied, a voltage of a gate of the driving transistor rises together with a voltage of the anode.

Light is output from the light emitting device in a fifth driving period in which ae voltage of the anode reaches a preset voltage.

A third capacitance of the variable capacitor unit in the fourth driving periods is smaller than the first capacitance in the third driving periods.

The light emitting display apparatus further includes a sensing transistor, wherein a first terminal of the sensing transistor is connected to the anode, a second terminal of the sensing transistor is connected to a sensing line to which an initialization voltage is supplied, and a gate of the sensing transistor is connected to a sensing control line to which a sensing control signal is supplied, and the sensing transistor is turned on in the first driving period and the anode is initialized.

The sensing transistor is turned on in the first driving period and is turned off in the second driving period and the third driving period.

The light emitting display apparatus according to the present disclosure can be applied to all electronic devices including a light emitting display panel. For example, the light emitting display apparatus according to the present disclosure can be applied to a virtual reality (VR) device, an augmented reality (AR) device, a mobile device, a video phone, a smart watch, a watch phone, or a wearable device, foldable device, rollable device, bendable device, flexible device, curved device, electronic notebook, e-book, PMP (portable multimedia player), PDA (personal digital assistant), MP3 player, mobile medical device, desktop PC, laptop PC, netbook computer, workstation, navigation, car navigation, vehicle display devices, televisions, wall paper display devices, signage devices, game devices, laptops, monitors, cameras, camcorders, and home appliances.

According to a light emitting display apparatus according to an embodiment of the present disclosure, the first capacitance of the variable capacitor provided between the anode and cathode of the light emitting device in the first driving period for initializing the gate of the driving transistor and the second driving period for removing the influence of the threshold voltage of the driving transistor is smaller than the second capacitance of the variable capacitor in the third driving period in which the data voltage is supplied to the gate of the driving transistor.

Accordingly, in the second driving period, the voltage of the anode can quickly rise until the difference between the voltage of the gate and anode of the driving transistor becomes the threshold voltage of the driving transistor Tdr.

Therefore, the influence of the threshold voltage of the driving transistor can be quickly removed, and accordingly, the light emitting device can be quickly driven to output light.

That is, according to the present disclosure, the voltage of the anode can be rapidly increased in the second driving period for threshold voltage compensation, and thus the driving time of the light emitting device can be shortened.

Therefore, according to a light emitting display apparatus according to the present disclosure, the light emitting device can output light based on the data voltage without being affected by the threshold voltage of the driving transistor, and the driving time for outputting light can be shortened.

Moreover, according to a light emitting display apparatus according to an embodiment of the present disclosure, the second capacitance in the third driving period in which the data voltage is supplied to the gate of the driving transistor is greater than the first capacitance in the second driving period.

Accordingly, in the third driving period, the voltage of the anode may not be saturated to a specific voltage, but can be gradually increased by the second capacitance.

In this case, the voltage of the first node connected to the source of the driving transistor and the anode of the light emitting device can increase in proportion to the mobility of electric charges, and the gate of the driving transistor can be constantly maintained with the data voltage Vdata.

Therefore, when the mobility is low, the voltage of the first node gradually increases, and accordingly, the difference value between the gate and source of the driving transistor becomes large, so that a large amount of current can flow through the driving transistor in the fifth driving period in which the light emitting device outputs light.

Moreover, when the mobility is high, the voltage of the first node increases rapidly, and accordingly, the difference value between the gate and source of the driving transistor becomes small, so that a small amount of current flows through the driving transistor in the fifth driving period in which the light emitting device outputs light.

Accordingly, a large amount of current capable of compensating for a small mobility can flow to the light emitting device, and a small amount of current capable of compensating for a large mobility can flow to the light emitting device.

Therefore, according to a light emitting display apparatus according to the present disclosure, the light emitting device is not affected by mobility, and the light emitting device can output light based on the data voltage.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the present disclosure.

What is claimed is:

1. A light emitting display apparatus comprising:
- a light emitting device including an anode and a cathode; and
- a pixel drive circuit connected to a gate line, a data line, and the light emitting device,
- wherein the pixel drive circuit includes:
  - a driving transistor connected to a first voltage supply line that supplies a first voltage and the light emitting device; and
  - a variable capacitor circuit connected to the anode and the cathode of the light emitting device,
  - wherein the variable capacitor circuit has a first capacitance during a first driving period and a second capacitance that is different from the first capacitance during a second driving period.

2. The light emitting display apparatus of claim 1, wherein the variable capacitor circuit includes:
- a first transistor including a first terminal, a second terminal that is connected to the anode and the driving transistor, and a gate electrode that is connected to the gate line; and
- a second transistor including a first terminal that is connected to the first terminal of the first transistor, a second terminal that is connected to the cathode, and a gate electrode that is connected to the first terminal of the second transistor and the first terminal of the first transistor.

3. The light emitting display apparatus of claim 2, further comprising:
- a switching transistor including a gate electrode that is connected to the gate line, a first terminal that is connected to the data line, and a second terminal that is connected to the gate electrode of the driving transistor.

4. The light emitting display apparatus of claim 2, wherein the first transistor and the second transistor are N-type transistors and a threshold voltage of the second transistor is greater than a threshold voltage of the first transistor and a threshold voltage of the driving transistor.

5. The light emitting display apparatus of claim 2, wherein the first transistor includes a first active layer, a first gate electrode, and a first gate insulation layer between the first active layer and the first gate electrode, the second transistor includes a second active layer, a second gate electrode, and a second gate insulation layer between the second active layer and the second gate electrode, and wherein a thickness of the second gate insulation layer is greater than a thickness of the first gate insulation layer.

6. The light emitting display apparatus of claim 2, wherein the first capacitance of the second transistor in the first driving period and a third driving period is less than the second capacitance of the second transistor in the second driving period in which a data voltage is transmitted through the data line, the second driving period after the first driving period and the third driving period, and a gate pulse that turns on the first transistor is supplied through the gate line from the first driving period, the third driving period, and the second driving period.

7. The light emitting display apparatus of claim 6, wherein during a fourth driving period in which the gate pulse is not supplied and is after the second driving period, a voltage of a gate electrode of the driving transistor rises with a voltage of the anode, and a third capacitance of the second transistor in the fourth driving period is less than the second capacitance in the second driving period.

8. The light emitting display apparatus of claim 6, further comprising:

a sensing transistor including a first terminal that is connected to the anode and the driving transistor, a second terminal that is connected to a sensing line that supplies an initialization voltage, and a gate electrode that is connected to a sensing control line that supplies a sensing control signal that turns on the sensing transistor, wherein the sensing transistor is turned on in the first driving period and the anode is initialized with the initialization voltage.

9. The light emitting display apparatus of claim 8, wherein the second transistor is turned off in the first driving period in which the sensing transistor is turned on and the second transistor is turned off in the third driving period in which the sensing transistor is turned off, and the second transistor is turned on in the second driving period.

10. The light emitting display apparatus of claim 1, wherein the variable capacitor circuit comprises:

a control transistor including a first terminal that is connected to the anode and the driving transistor, a second terminal that is connected to the cathode, and a double gate structure including a first gate electrode that is connected to the first terminal of the control transistor and the driving transistor.

11. The light emitting display apparatus of claim 10, wherein the double gate structure further includes a second gate that is connected to a body control line that supplies a body control signal.

12. The light emitting display apparatus of claim 11, wherein the first capacitance of the control transistor in the first driving period and a third driving period is less than the second capacitance of the control transistor in the second driving period in which a data voltage is transmitted through the data line, the second driving period after the first driving period and the third driving period, wherein a gate pulse that turns on a switching transistor that is connected to the driving transistor and the data line is supplied during the first driving period, the third driving period, and the second driving period, and the body control signal that turns on the control transistor is supplied through the body control line in the second driving period.

13. The light emitting display apparatus of claim 12, wherein in a fourth driving period in which the gate pulse is not supplied where the fourth driving period is after the second driving period, a voltage of a gate electrode of the driving transistor rises together with a voltage of the anode, and wherein a third capacitance of the control transistor in the fourth driving period is less than the second capacitance in the second driving period.

14. The light emitting display apparatus of claim 12, further comprising:

a sensing transistor including a first terminal that is connected to the anode and the driving transistor, a second terminal that is connected to a sensing line that supplies an initialization voltage, and a gate electrode that is connected to a sensing control line that supplies a sensing control signal, wherein the sensing transistor is turned on in the first driving period and the anode is initialized with the initialization voltage.

15. The light emitting display apparatus of claim 14, wherein the control transistor is turned off in the first driving period in which the sensing transistor is turned on and the control transistor is turned off in the third driving period in which the sensing transistor is turned off, and the control transistor is turned on in the second driving period.

16. The light emitting display apparatus of claim 1, wherein a first capacitance of the variable capacitor circuit in the first driving period and a third driving period that are before the second driving period is less than the second capacitance of the variable capacitor circuit in the second driving period in which a data voltage is transmitted through the data line, and wherein a gate pulse that turns on a switching transistor that is connected to the driving transistor and the data line is supplied from the first driving period, the third driving period, and the second driving period.

17. The light emitting display apparatus of claim 16, wherein in a fourth driving period when the gate pulse is not supplied where the fourth driving period is after the second driving period, a voltage of a gate electrode of the driving transistor rises together with a voltage of the anode, and light is output from the light emitting device in a fifth driving period in which a voltage of the anode reaches a preset voltage where the fifth driving period is after the fourth driving period.

18. The light emitting display apparatus of claim 16, wherein in a fourth driving period in which the gate pulse is not supplied where the fourth driving period is after the second driving period, a voltage of a gate of the driving transistor rises together with a voltage of the anode, and a third capacitance of the variable capacitor circuit in the fourth driving period is less than the second capacitance in the second driving period.

19. The light emitting display apparatus of claim 16, further comprising:

a sensing transistor including a first terminal that is connected to the anode and the driving transistor, a second terminal that is connected to a sensing line that supplies an initialization voltage, and a gate electrode that is connected to a sensing control line that supplies a sensing control signal, and wherein the sensing transistor is turned on in the first driving period and the anode is initialized to the initialization voltage.

20. The light emitting display apparatus of claim 19, wherein the sensing transistor is turned on in the first driving period and is turned off in the second driving period and the third driving period.

21. A light emitting display apparatus comprising:

a light emitting device including an anode and a cathode; and a pixel drive circuit connected to a gate line, a data line, and the light emitting device, wherein the pixel drive circuit includes:

a driving transistor connected to a first voltage supply line that supplies a first voltage and the light emitting device; and a variable capacitor circuit connected to the anode and the cathode of the light emitting device, wherein a capacitance of the variable capacitor circuit in a driving period during which a data voltage is supplied to the driving transistor is greater than a capacitance of the variable capacitor circuit in other driving periods of the pixel drive circuit.

22. The light emitting display apparatus of claim 21, wherein the variable capacitor circuit includes:

a first transistor including a first terminal, a second terminal that is connected to the anode and the driving transistor, and a gate electrode that is connected to the gate line; and a second transistor including a first terminal that is connected to the first terminal of the first transistor, a second terminal that is connected to the cathode, and a gate electrode that is connected to the first terminal of the second transistor and the first terminal of the first transistor.

23. The light emitting display apparatus of claim 22, wherein the first transistor and the second transistor are N-type transistors and a threshold voltage of the second transistor is greater than a threshold voltage of the first transistor and a threshold voltage of the driving transistor.

24. The light emitting display apparatus of claim 21, wherein the variable capacitor circuit comprises:

a control transistor including a first terminal that is connected to the anode and the driving transistor, a second terminal that is connected to the cathode, and a double gate structure including a first gate electrode that is connected to the first terminal of the control transistor and the driving transistor and a second gate that is connected to a body control line that supplies a body control signal that turns on the control transistor.

25. The light emitting display apparatus of claim 21, wherein the capacitance of the variable capacitor circuit in the driving period during which the data voltage is supplied to the driving transistor is greater than a capacitance of the variable capacitor circuit in a first driving period and a second driving period that are before the driving period during which the data voltage is supplied to the driving transistor, and wherein a gate pulse that turns on a switching transistor that is connected to the driving transistor and the data line is supplied in the first driving period, the second driving period, and the driving period during which the data voltage is supplied to the driving transistor.

26. The light emitting display apparatus of claim 25, wherein a capacitance of the variable capacitor circuit in a driving period when light is output from the light emitting device is less than the capacitance of the variable capacitor circuit in the driving period during which the data voltage is supplied to the driving transistor.

* * * * *